United States Patent [19]

Mori et al.

[11] Patent Number: 4,880,857

[45] Date of Patent: Nov. 14, 1989

[54] CARBON BLACK-GRAFT POLYMER, METHOD FOR PRODUCTION THEREOF, AND USE THEREOF

[75] Inventors: Yoshikuni Mori, Settsu; Mitsuo Kushino, Minoo; Hayato Ikeda, Settsu; Nobuaki Urashima, Takatsuki; Masuji Izubayashi, Nishinomiya; Shigeru Tanimori, Hirakata; Yoshihiro Arita, Takatsuki; Kiyoshi Kawamura, Mishima; Kenji Minami, Suita; Yoshinori Sano, Kobe, all of Japan

[73] Assignee: Nippon Shokubai Kagaku Kogyo Co., Ltd., Osaka, Japan

[21] Appl. No.: 134,319

[22] Filed: Dec. 16, 1987

[30] Foreign Application Priority Data

| Dec. 17, 1986 | [JP] | Japan | 61-298985 |
| Apr. 24, 1987 | [JP] | Japan | 62-99648 |
| May 21, 1987 | [JP] | Japan | 62-122476 |
| May 29, 1987 | [JP] | Japan | 62-131272 |
| Jul. 8, 1987 | [JP] | Japan | 62-168868 |
| Aug. 25, 1987 | [JP] | Japan | 62-209303 |
| Sep. 3, 1987 | [JP] | Japan | 62-219097 |
| Sep. 22, 1987 | [JP] | Japan | 62-236212 |
| Sep. 22, 1987 | [JP] | Japan | 62-236214 |
| Sep. 25, 1987 | [JP] | Japan | 62-238621 |

[51] Int. Cl.$^4$ .............. C08K 3/04; C08F 292/00
[52] U.S. Cl. .................. 523/205; 523/215; 523/468; 524/495; 524/547; 524/548; 524/549; 524/555; 524/602; 524/603; 524/612; 525/326.7; 525/326.8; 525/327.3; 525/329.4; 430/106; 430/109; 430/137
[58] Field of Search .............. 523/205, 215, 305, 468; 525/327.3, 326.7, 326.8, 329.4, 403, 437; 524/495, 547, 548, 549, 555, 602, 603, 612

[56] References Cited

U.S. PATENT DOCUMENTS

| 2,933,416 | 4/1960 | Haakh | 524/602 |
| 3,557,040 | 1/1971 | Takashina | 523/305 |
| 3,623,986 | 11/1971 | Machida | 523/205 |
| 3,661,632 | 5/1972 | Gagliardi | 524/549 |
| 3,697,476 | 10/1972 | Lagally | 523/215 |

FOREIGN PATENT DOCUMENTS

| 42-22047 | 10/1967 | Japan. |  |
| 44-3826 | 2/1969 | Japan. |  |
| 45-17284 | 6/1970 | Japan. |  |
| 46-26970 | 8/1971 | Japan. |  |
| 51-38357 | 10/1976 | Japan. |  |
| 287921 | 12/1986 | Japan | 525/327.3 |

OTHER PUBLICATIONS

Tsubokawa et al, *Kobunshi Ronbunshu*, vol. 41, No. 10, pp. 597–603 (Oct. 1984), "The Curing of Epoxy Resins by Carbon Black" and Abstract thereof.
Tsubokawa et al, *Kobunshi Ronbunshu*, vol., 40, No. 11, pp. 753–59 (Nov. 1983), "Gelation of Urethane Propolymer . . . " and Abstract thereof.
Tsubokawa et al, *J. Polym. Sci. Polym. Chem. Ed.*, "Grafting onto Carbon Black: Reaction of Urethane Prepolymer with Carbon Black Surface", vol. 20, pp. 1943–1946, (1982).

*Primary Examiner*—Lewis T. Jacobs
*Assistant Examiner*—David Buttner
*Attorney, Agent, or Firm*—Burns, Doane, Swecker & Mathis

[57] ABSTRACT

A carbon black-graft polymer, produced by causing a polymer possessing within the molecular unit thereof at least one reactive group selected from the class consisting of aziridine group, oxazoline group. N-hydroxyalkylamide group, epoxy group, and thioepoxy group to react with carbon black. The polymer can be used as a toner for electrostatically charged image, resin composition, coating composition, ink for thermographic transer, coating gent for magnetic recording medium, rubber composition, and carbon black dispersion and the like.

10 Claims, No Drawings

CARBON BLACK-GRAFT POLYMER, METHOD FOR PRODUCTION THEREOF, AND USE THEREOF

BACKGROUND OF THE INVENTION

1. Field of the Invention

This invention relates to a novel carbon black-graft polymer, a method for the production thereof, and use thereof. More particularly, this invention relates to a carbon black-graft polymer produced by the reaction of a polymer possessing a specific reactive group with carbon black and useful in toner for developing electrostatically charged images, resin composition, coating composition, ink for thermographic transfer, coating agent for thermographic transfer ink ribbon, back-coating agent for magnetic recording medium, rubber composition, and carbon black dispersion, a method for the production of the polymer, and use thereof.

2. Description of the Prior Art

Carbon black excels in coloring property, electroconductivity, weatherability, chemical resistance, etc. and, because of these features, has been finding extensive utility in various applications as reinforcing agents and fillers for plastics and elastomers. Since carbon black by nature comes in powdery or granular form, it is rarely used by itself. It is enabled to manifest the characteristic features thereof by being uniformly dispersed in a solid substance such as rubber or resin or in a liquid such as water or solvent.

The affinity of carbon black for other substances such as organic macromolecular compound, water, and organic solvent is weak as compared with the cohesive force generated between the particles of carbon black. It is extremely difficult, therefore, for carbon black to be uniformly mixed with or dispersed in other substances under ordinary mixing or dispersing conditions.

For the solution of this problem, many methods are being studied which are directed to enabling carbon black to be uniformly mixed with or dispersed in a solid or liquid substrate by coating the surface of carbon black with a varying surfactant or resin thereby enhancing the affinity of carbon black for the substrate.

Particularly, the carbon black-graft polymer which is obtained by polymerizing a polymerizable monomer in the presence of carbon black has been attracting attention because the hydrophilicity and/or oleophilicity thereof can be sitably varied by suitably selecting the kind of the polymerizable monomer.

Methods for the production of the carbon black-graft polymer are disclosed in Japanese Patent Publications SHO 42(1967)-22,047, SHO 44(1969)-3,826, and SHO 45(1970)-17,284, and U.S. Pat. No. 3,557,040, for example. These methods, however, produce carbon black-graft polymer of their species in low yields falling on the order of several to ten-odd percent. Most of these products occur in the form of vinyl type homopolymers and betray very poor efficiency of the surface treatment given to carbon black. The methods, therefore, have not improved the affinity of carbon black for other substances so much as are expected. Frequently, the conditions in which these products are dispersed in substrates are varied by mixing or dispersing conditions.

An object of this invention, therefore, is to provide a novel carbon black-graft polymer, a method for the production thereof, and use therof.

Another object of this invention is to provide a carbon black-graft polymer useful in toner for developing electrostatically charged images, resin composition, coating composition, ink for thermographic transfer, coating agent for thermographic transfer ink ribbon, back-coating agent for magnetic recording medium, rubber composition, and carbon black dispersion, a method for the production of the polymer, and use thereof.

SUMMARY OF THE INVENTION

The objects described above are accomplished by a carbon black-graft polymer, produced by a procedure which comprises causing a polymer possessing in the molecular unit thereof at least one reactive group selected from the class consisting of aziridine group, oxazoline group, N-hydroxyalkylamide group, epoxy group, and thioepoxy group to react with carbon black.

Further, these objects are accomplished by a method for the production of a carbon black-graft polymer, which comprises causing a polymer possessing in the molecular unit thereof at least one reactive group selected from the class consisting of aziridine group, oxazoline group, N-hydroxyalkylamide group, epoxy group, and thioepoxy group to react with carbon black at a temperature in the range of 20° to 350° C.

The carbon black-graft polymer can be used by itself as a toner for developing electrostatically charged images. It can also be used as combined with various resin binders, rubbers, and solvents, in a wide variety of applications such as to a toner for developing electrostatically charged images, thermoplastic resin composition, thermosetting resin composition, coating composition, rubber composition, thermographic ink, coating agent for thermographic ink ribbon, back-coating agent for magnetic recording medium, rubber composition, and carbon black dispersion.

We have found that a polymer possessing a specific reative group within the molecular unit thereof reacts highly efficiently with the functional group on the surface of carbon black, that the carbon black-graft polymer produced by the reaction shows highly desirable dispersibility in various substances, and that a carbon black-graft polymer of particularly high despersibility can be easily produced by selecting specific reaction condition.

DESCRIPTION OF THE PREFERRED EMBODIMENT

This invention is directed to a carbon black-graft polymer produced by a produce which comprises causing a polymer possessing within the molecular unit thereof at least one reactive group selected from the class consisting of aziridine group, oxazoline group, N-hydroxyalkylamide group, epoxy group, and thioepoxy group (hereinafter referred to as "polymer (A) possessing a reactive group") to react with carbon black. As the carbon black used in the present invention, there may be used any kinds of carbon black such as furnace black, channel black, acetylene black, thermal black, lamp black, etc.

The polymer (A) possessing a reactive group embraces such polymers as vinyl type polymers, polyesters, and polyethers which possess within the molecular unit thereof at least one reactive group selected from the class consisting of aziridine group, oxazoline group, N-hydroxyalkylamide group, epoxy group, and thioepoxy group. The group which can react with the functional group on the surface of carbon black is not limited to the reactive group defined above. When a polymer possessing a group other than the reactive group defined above is used, the reaction must be preceded by a step for giving a pretreatment to the carbon black.

As means of producing the polymer (A) possessing the reactivity, there can be cited (1) a method which causes a polymerizable monomer (a) possessing the reactive group in the molecular unit thereof to be polymerized (hereinafter referred to monomer (a)), when necessary, in combination with other polymerizable monomer (b) (hereinafter referred to monomer (b)), (2) a method which causes a compound (c) possessing the reactive group (hereinafter referred to compound (c)) in the molecular unit thereof to react with a polymer (d) capable of reacting with the compound (hereinafter referred to polymer (d)) to effect introduction of the reactive group in the polymer, and (3) a method which causes in the polymer (A) possessing the reactivity by a conventional method using a polymer (e) possessing the reactive group other than said reactive group (hereinafter referred to polymer (e)).

As examples of the polymerizale monomer possessing the aforementioned reactive group (a) which can be used in the method (1), there can be cited aziridine group-containing polymerizable monomers represented by the following formulas:

$CH_2=CH-N\triangleleft$ $CH_2=CH-CH_2-N\triangleleft$

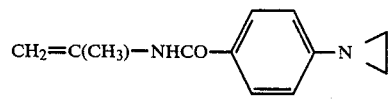

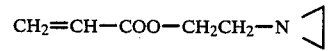

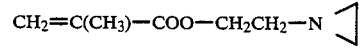

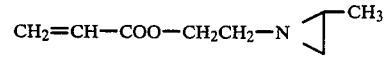

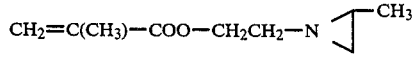

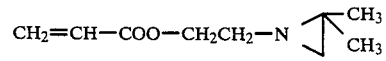

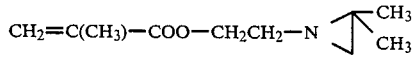

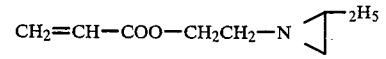

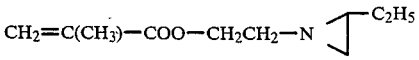

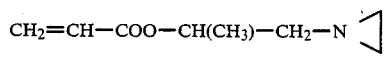

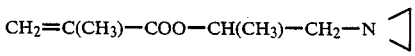

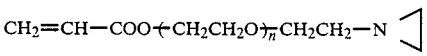

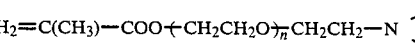

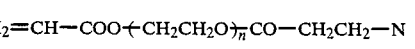

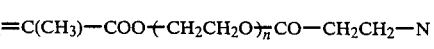

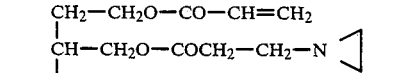

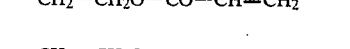

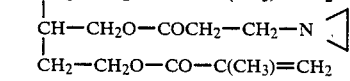

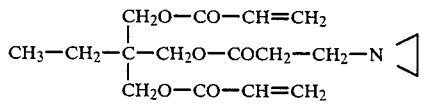

-continued

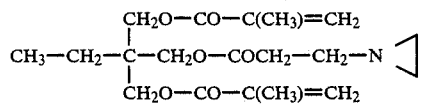
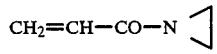
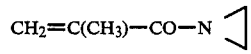
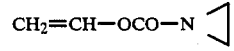
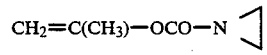
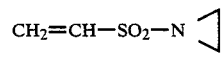
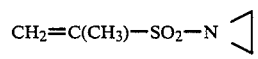
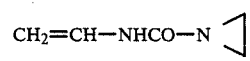
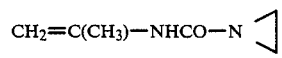
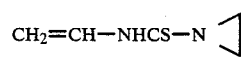
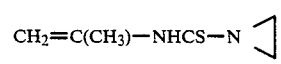
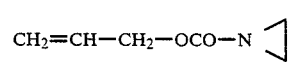
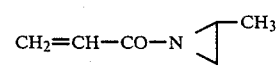
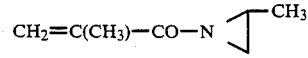
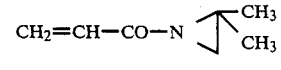
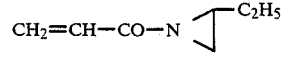
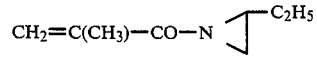
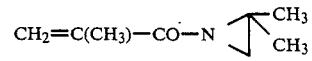
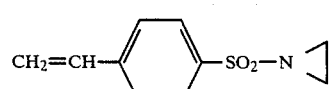

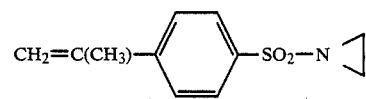
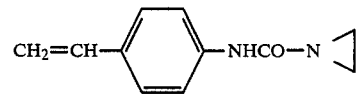
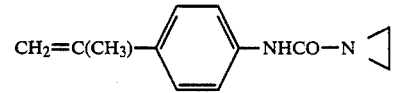
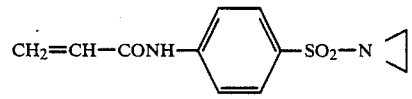
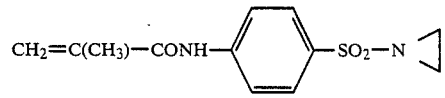
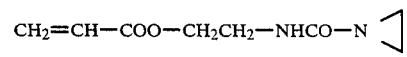
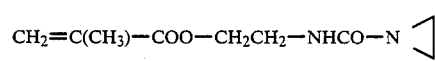
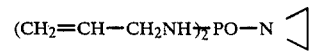

oxazoline group-containing polymerizable monomers such as 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-5-ethyl-2-oxazoline, 2-Isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, and 2-isopropenyl-4,5-dimethyl-2-oxazoline; N-hydroxy alkylamide group-containing polymerizable monomers such as N-hydroxymethyl acrylamide, N-hydroxyethyl acrylamide, N-hydroxybutyl acrylamide, N-hydroxyisobutyl acrylamide, N-hydroxy-2-ethylhexyl acrylamide, N-hydroxycyclohexyl acrylamide, N-hydroxymethyl methacrylamide, N-hydroxyethyl methacrylamide, N-hydroxybutyl methacrylamide, N-hydroxyisobutyl methacrylamide, N-hydroxy-2-ethylhexyl methacrylamide, and N-hydroxycyclohexyl methacrylamide; epoxy group-containing polymerizable monomers represented by the following formulas:

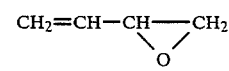
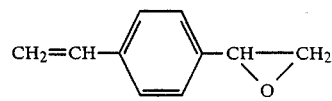
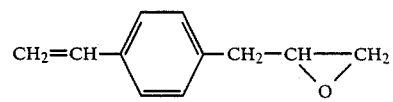

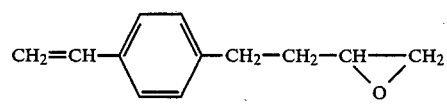
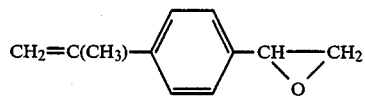
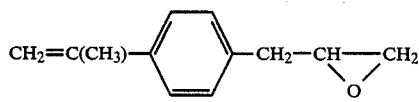
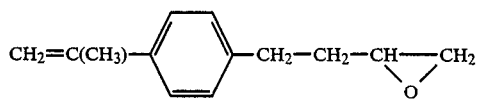
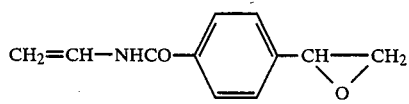
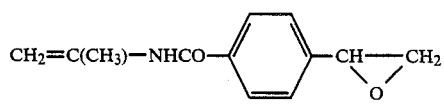
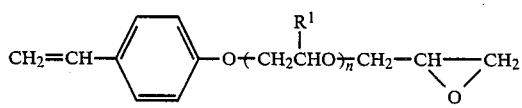
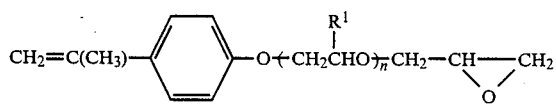
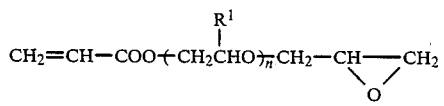
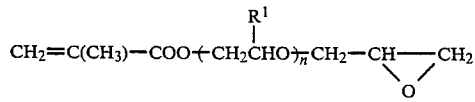

wherein $R^1$ stands for a hydrogen atom or a methyl group and n for 0 or an integer in the range of 1 to 20; and thioepoxy group-containing polymerizable monomers represented by the following formulas:

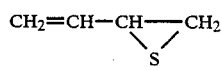
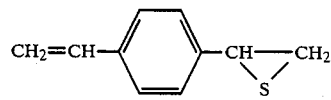
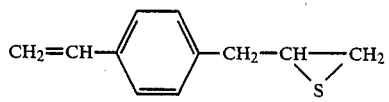

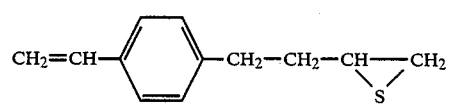
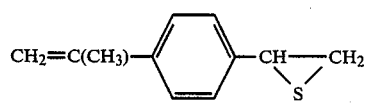
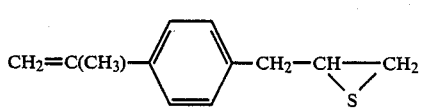
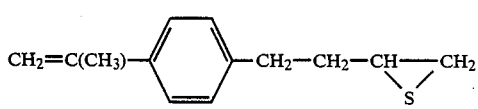
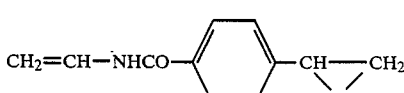
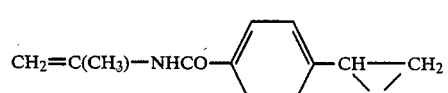
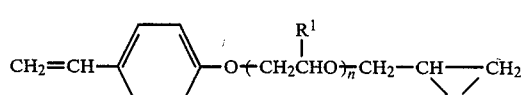
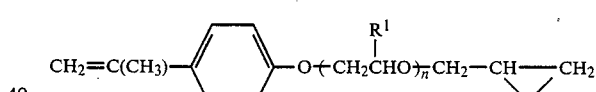
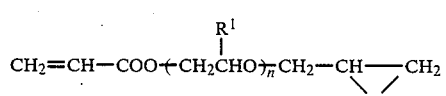
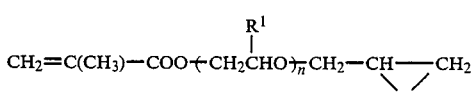

wherein $R^1$ and n have the same meanings as defined above in the case of the epoxy group-containing polymerizable monomers; and a thioepoxy group containing polymerizable monomer. One member or a mixture of two or more members selected from the group of monomers cited above can be suitably used.

The monomer which (b) is optionally used in combination with the monomer (a) in the process (1) is not specifically restricted so long as it meets the sole requirement that it should be copolymerizable with the monomer (a). As examples of the monomer which answer the description, there can be cited styrene type monomers such as styrene, o-methyl styrene, m-methyl styrene, p-methyl styrene, α-methyl styrene, p-methoxy styrene, p-tert-butyl styrene, p-phenyl styrene, o-chlorostyrene, m-chlorostyrene, and p-chlorostyrene; acrylic acid or methacrylic acid type monomers such as acrylic acid, methyl acrylate, ethyl acrylate, n-butyl acrylate, isobutyl acrylate, dodecyl acrylate, stearyl acrylate, 2-ethylhexyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; and ethylene, propylene, butylene, vinyl chloride, vinyl acetate, acrylonitrile, acrylamide, methacrylamide, and N-vinyl pyrrolidone. One member or a mixture of two or more members selected from the monomers cited above may be suitably used.

In accordance with the method of (1), the polymer (A) possessing a reactive group is obtained simply by polymerizing a polymer (a) optionally in combination with a monomer (b) by any of the conventional methods such as, for example, bulk polymerization method, suspension polymerizatioin method, emulsion polymerization method, precipitation polymerization method, and solution polymerization.

As examples of the compound (c) which is usable in the method of (2), there can be cited:

(2-1) Compounds at least two groups of one kind of selected from the aforementioned class of reactive groups within the molecular unit thereof, (2-2) Compounds possessing at least two groups of different kinds selected from the aforementioned class of reactive groups within the molecular unit thereof, and (2-3) Compounds possessing at least one group selected from the afornentioned class of reactive groups and other groups not belonging to the aforementioned class within the molecular unit thereof. The "other groups not belonging to the aforementioned class" mentioned in (2-3) are those other than aziridine group, oxazoline group, N-hydroxyalkylamide group, epoxy group, and thioepoxy group and capable of reacting with the groups contained in the polymer (d) which will be described fully later on. For example, isocyanate group, amino group, carboxyl group, hydroxyl group, vinyl group, and haogen atom answer the description.

Example of the polymer (d) to be used in the method of (2) are vinyl type polymers, polyester, and polyethers which possess groups capable of reacting with the compounds (c) set forth in the aforementioned items, (2-1) through (2-3). As examples of the group capable of reacting with the compound (c), there can be cited hydroxyl group, phenolic hydroxyl groups, carboxyl group, quinone group, amino group, and epoxy group. The polymers possessing these groups can be easily obtained by any of the conventional procedures of polymerization such as radical polymerization and polycondensation.

In accordance with the method of (2), the polymer (A) possessing a reactive group is obtained by simply by causing reaction of the compound (c) and the polymer (d) under conditions selected so that at least one group of the aforementioned class of reactive groups will remain unaltered.

The polymer (e) in the method of (3) is a polymer which possesses within the molecular unit thereof a vinyl group, carboxyl group, a chlorohydrin group, or a glycol group, i.e. a group capable of being converted into an aziridine group, an oxazoline group, an N-hydroxyalkylamide group, an epoxy group, or a thioepoxy group. This polymer can be easily converted by the conventional method into the group (A) possessing an aziridine group, an oxazoline group, an N-hydroxyalkylamide group, an epoxy group and/or a thioepoxy group.

In the present invention, the polymer (A) is suitably selected, depending on the particular property such as, for example, hydrophilicity, oleophilicity, or other form of affinity which is desired to be imparted to the carbon black-graft polymer. When hydrophilicity is desired to be imparted, for example, a vinyl type polymer or a polyester which has acrylic acid as a main component thereof is advantageously used. When oleophilicity is to be imparted, a vinyl type polymer or a polyester which has styrene as a main component thereof is ued advantageously. The molecular weight of the polymer (A) is not specifically limited. From the standpoint of the conspicuity of the effect of treatment on carbon black and the operatonal convenience during the course of the reaction, however, the polymer (A) is desired to possess a number average molecular weight in the range of 500 to 1,000,000, more advantageously 1,000 to 500,000, and most advantageously 2,000 to 100,000. Among the reactive group of the polymer (A), aziridine group, oxazoline group and N-hydroxyalkylamide group are the most preferable, and the meanings to be used such polymer possessing reactivity (A) is to react carbon black with the polymer (A) in high graft efficiency even under a mild condition to obtain carbon black graft polymer excellent in dispersibility to various substances in spite of kind and state of carbon black.

When the reactive group is an epoxy group or a thioepoxy group, the reactivity of the reactive group is lowered in proportion as the pH value of carbon black is high. For the carbon black to be used effectively, therefore, it is desired to have a pH value of not more than 8, preferably not more than 6. The test of carbon black for the pH value is performed by the method defined by Japanese Industrial Standard (JIS) K 6221. Though the polymer (A) must contain as a reactive group at least one epoxy group or thioepoxy group on the average in the molecular unit thereof, the polymer gains in viscosity and loses operational efficiency during the reaction thereof with carbon black and the carbon black-graft polymer obtained by the reaction loses dispersibility in other substances in proportion as the reactive group content of the polymer increases. Thus, the average number of reactive groups contained in the molecular unit is desired to fall in the range of 1 to 5, preferably 1 to 2. Most desirably, the polymer (A) contains one epoxy group or thioepoxy group.

The carbon black-graft polymer of this invention is produced by the reaction of the polymer (A) possessing a reactive group upon carbon black. It has the polymer (A) bonded with extremely high efficiency by grafting to carbon black. This reaction can be effected by any of various method. For example, the method which comprises causing the polymer (A) possessing a reactive group and obtained by the aforementioned method of (1) or (2) to react with carbon black may be used. Alternatively, a step for obtaining the polymer (A) possessing a reactive group by working the method of (1) or (2) in the presence of carbon black and a step for effecting reaction of the polymer (A) with carbon black may be combined as one method. For the purpose of obtaining the carbon black-graft polymer with high graft efficiency, the reaction is desired to be carried out by the former of the two methods just cited.

The amount of the polymer (A) possessing a reactive group to be used in the reaction with carbon black can be freely selected to suit the purpose for which the produced carbon black-graft polymer is used. To ensure thorough manifestation of the effect in improving the dispersibility of carbon black-graft polymer in various substances and avoid impairing the characteristic properties inherent in carbon black, the amount of the polymer (A) is advantageously selected in the range of 1 to 3,000 parts by weight, more desirably 5 to 1,000 parts by weight, and most desirably 50 to 500 parts by weight, based on 100 parts by weight of carbon black.

This invention also provides a method for easily producing carbon black-graft polymer of notably enhanced dispersibility in various substances. This method of production is effected by stirring carbon black and the polymer (A) possessing a reactive group at a temperature in the range of 20° to 350°, preferably 50° to 300° C. Further, it can be attained by kneading carbon black and the polymer (A) possessing reactivity in the range of 0.01 to 20 kg.m, preferably 0.1 to 10 kg.m of torque value, per 50 cc of total amount. The carbon black-graft polymer produced by the method of this invention possesses highly improved properties because the carbon black used in the state of secondary agglomeration as a raw material, while being stirred with the polymer for reaction, is efficiently disintegrated and transformed into discrete particles minute and uniform in diameter and, what is more, the reaction consequently induced proceeds with improved efficiency. When the reaction temperature exceeds 350° C., there ensues a disadvantage that the polymer component of the reaction system undergoes degeneration. When the torque value exceeds 50 kg m, per 50 cc of total amount, there ensues a disadvantage such as deterioration by cut of polymer (A).

In the method of the present invention, the reaction of carbon black with the polymer (A) possessing a reactive group may proceed exclusively between the two components mentioned or in the presence of other substances such as a polymer component other than the polymer (A) possessing a reactive group, a polymerizable monomer, an organic solvent, and water. In one typical way of working the method of the present invention, the carbon black-graft polymer of the present invention is obtained by preparing a mixture consisting of 100 parts by weight of carbon black, 1 to 3,000 parts by weight, preferably 5 to 1,000 parts by weight, of the polymer (A) possessing a reactive group, 0 to 1,000 parts by weight of a polymer possessing no reactive group, 0 to 200 parts by weight of a polymerizable monomer, and 0 to 1,000 parts by weight of an organic solvent and stirring the mixture at a temperature in the range of 20° to 350° C., preferably 50° to 300° C.

The carbon black-graft polymer of the present invention is produced by the reaction of the polymer (A) possessing a reactive group with carbon black. Since the reactive group in the polymer (A) possesses high reactivity with the functional group on the surface of carbon black, the polymer (A) is grafted with high efficiency to the surface of carbon black. Only so long as the polymer (A) possesses a reactive group conforming with the definition given in this invention, it can be freely selected without any discrimination on account of composition and kind so as to impart to the carbon black varying properties suiting the intended application of the product. The carbon black-graft polymer consequently produced possesses improved affinity for various substances and excels in dispersibility in such substances as organic macromolecular compounds, water, and organic solvents and, therefore, can be advantageously used as coloring agents for inks, toners in copying machines, coating materials, and plastic molding materials and as modifying agents for various macromolecular compounds. Further in accordance with the method of this invention, the carbon black-graft properties represented by dispersibility can be produced by a simple procedure of merely sitrring the polymer (A) possessing a reactive group with carbon black under application of heat. Thus, the method of the present invention for the production of carbon black-graft polymer proves to be highly advantageous from the economic point of view.

The toner of the present invention to be used for the development of electrostatic charge images is a product incorporating therein the carbon black-graft polymer described above. The carbon black-graft polymer by itself or a mixture of the carbon black-graft polymer with a polymer not answering the description of the polymer (A), on being finely pulverized, can be used without any further modification as the toner of the present invention for the development of electrostatic charge images. From the standpoint of the fixability of developed images, the toner is desired to incorporate additionally therein the polymer other than the polymer (A). It is particularly desirable that the polymer other than the polymer (A) is a thermoplastic polymer. The polymer other than the polymer (A) may be mixed during and/or after reaction of the carbon black with the polymer.

The carbon black content of the toner of the present invention for the development of electrostatic images charge is not specifically limited but can be selected in a wide range so as to suit the particular purpose of use. Generally, this content is in the range of 1 to 20% by weight, preferably 3 to 10% by weight, based on the total amount of the toner. The toner may suitably incorporate therein conventional additives such as, for example, a charge controlling agent and an offset preventing agent.

For the toner of the present invention to be effectively used in the production of images with an electrophotographic developing system, it is generally used either in the form of a two-component developing agent obtained by mixing the toner with fine magnetic particles or in the form of a one-component developing agent obtained by causing the fine magnetic particles to be contained in the toner. The fine magnetic particles can be made of any material inherently magnetic or capable of being magnetized. Examples of the material usable for the fine magnetic particles include such metals as iron, manganese, nickel, cobalt, and chromium and such ferromagnetic alloys as magnetite, maghemite, various ferrites, and manganese alloys.

In the case of the two-component developing agent, the fine magnetic particles are prepared with an average diameter in the range of 20 to 100 microns, preferably 40 to 80 microns and are used as a carrier. The amount of the fine magnetic particles to be used generally falls in the range of 70 to 99% by weight, preferably 90 to 97% by weight, based on the total amount of the developing agent. In the case of the one-component developing agent, the fine magnetic particles prepared with an average diameter approximately in the range of 0.05 to 5 microns, preferably 0.1 to 2 microns, can be used. The amount of the fine magnetic particles to be used in this case generally fall in the range of 1.5 to 70% by weight, preferably 25 to 45% by weight, based on the total amount of the developing agent.

Since the toner of this invention for the development of electrostatic charge images used the carbon black-graft polymer obtained by the method of this invention and, therefore, enjoys high homogeneity of dispersion of carbon black in the resin, the toner entails only slight liberation of carbon black during the course of fine pulverization, enjoys uniform distribution of electric charge among the individual particles thereof, enables images to be stably developed in an unsweared form, and consequently warrants production of visible images clear and sharp in outline and rich in contrast. Thus, the toner of the present invention can be advantageously used for printing with a wide variety of electrophotographic developing devices such as, for example, copy machine, laser printer, LED (light-emitting diode) printer, and liquid crystal printer.

Another use found for the carbon black-graft polymer is as coloring agents for thermoplastic resin and thermosetting resin.

Examples of the thermosetting resin for which the carbon black-graft polymer of this invention is advantageously used as the coloring agent include unsaturated polyester resins obtained by dissolving unsaturated polyesters in polymerizable monomers represented by styrene, epoxy resins, diallyl phthalate resins, phenol resins, amino resins represented by melamine resin, polyimide resins, and polyurethane resins.

The combination of the carbon black-graft polymer and a thermosetting resin can be accomplished, for example, by a method which comprises directly adding fine carbon black-graft polymer particles to the thermosetting resin and thoroughly mixing the two component by stirring or a method which comprises dispersing the fine carbon black-graft polymer particles in a monomer such as, for example, styrene which is copolymerizable with the thermosetting resin and thereafter mixing the resultant dispersion with the thermosetting resin. The proportion of the carbon black-graft polymer to be used in the combination is in the range of 0.05 to 50% by weight, preferably 0.1 to 30% by weight, based on the total amount of the thermoplastic resin and the carbon black-graft polymer. If this proportion is less than 0.05% by weight, then the thermosetting resin produced by the combination is deficient in cloring property, electroconductivity, heat resistance, wear resistance, and repression of shrinkage. Conversely if this proportion is unduly large, there ensues a disadvantage that the characteristic properties of the thermoplastic resin are impaired.

In the thermosetting resin composition which is obtained as described above, since the polymer in the carbon black-graft polymer possesses affinity for carbon black and this polymer, through suitable selection of the composition itself, acquires affinity additionally for the resin of the matrix of the thermosetting resin composition, it is dispersed very uniformly and stably in the composition so as to manifest an outstanding effect in imparting to the produced composition such desirable qualities as uniformity of coloration, ability to inhibit static charging, resistance to heat, and wear resistance. Further, the polymer component in the carbon black-graft polymer is enabled to manifest an effect in alleviating the shrinkage of the matrix resin during the course of thermal setting. Though the thermosetting resin composition of the present invention can be effectively used in the unmodified form, it may be used in combination with fillers such as calcium carbonate, silica sand, barium sulfate, and clay, reinforcing fibrous materials such as glass fibers, asbestos, hemp, vinylon fibers, carbon fibers, $\alpha$-cellulose, and wood flour, tackifiers such as magnesium oxide and magnesium hydroxide, and coloring agents to produce shaped articles which are suitable as automobile parts, electric appliances, and household utensils.

Examples of the thermoplastic resin for which the carbon black-graft polymr of the present invention is advantageously used include unsaturated polyesters such as polyethylene terephthalate and polybutylene terephthalate, acrylic resins such as methyl methacrylic resin, polycarbonates, polyimides, vinyl chloride polymers, styrene polymers, polyamides, polyolefins, butyral resins, and polyurethanes. Among other thermoplastic resins enumerated above, unsaturated polyesters prove to be particularly desirable.

In the thermoplastic resin composition, the carbon black-graft polymer of the present invention is incorporated in an amount in the range of 0.001 to 50% by weight, preferably 0.01 to 20% by weight, based on the amount of the composition. If the amount of the carbon black-graft polymer added is less than 0.01% by weight, it is difficult for the produced thermoplastic resin composition to acquire highly desirable surface smoothness, homogeneity of texture, lubricity, antiblocking property, and antistatic property. Conversely, if the amount exceeds 50% by weight, the excess carbon black-graft polymer brings about an adverse effect on the smoothness and strength of the resin composition when this composition is fabricated in the form of film or fibers and causes breakage of such film or fibers during the course of molding.

The incorporation of the carbon black-graft polymer in the thermoplastic resin such as, for example, a polyester can be effected by either of the following methods.

(1) A method which comprises adding a carbon black-graft polymer to an interesterification product of dimethyl terephthalate and ethylene glycol and subjecting the resultant mixture to polycondensation thereby obtaining a polyester composition aimed at.

(2) A method which comprises preparing a polyester from dimethyl terephthalate and ethylene glycol and mixing the polyester with the carbon black-graft polymer by stirring.

Alternatively, the incorporation may be effected by directly combining the carbon black-graft polymer with the thermoplastic resin.

Because of the fact that a carbon black-graft polymer obtained by the specific method is incorporated therein, the thermoplastic resin composition of this invention is enabled to produce shaped articles such as films and fibers which excel in lubricity, smoothness, antiblocking property, wear resistance, homogeneity, ability to prevent static charging, and workability. The polyester composition which accords with the present invention, therefore, can be used as films for magnetic tapes and wraps and as finished yarns.

Another use found for the carbon black-graft polymer is as a coating composition. The binder to be used in the coating composition is a thermoplastic resin, a thermosetting resin, or a reactive resin which is enabled by being applied on a varying substrate to form a coating film thereon. One member or a mixing of two or more members selected from the group consisting of thermoplastic resins, thermosetting resins, and reactive resins can be used as the binder.

Among other usable thermoplastic resins, those having average molecular weights in the range of 1,000 to 1,000,000, preferably 2,000 to 500,000, prove to be particularly advantageous. As concrete examples of such particularly advantageous thermoplastic resins, there can be cited vinyl chloride type resins such as vinyl chloride polymers and vinyl chloride-vinylidene chloride copolymers: vinyl ester type resins such as vinyl acetate polymer, vinyl acetate-ethylene copolymer, and vinyl acetate-methyl methacrylate copolymer, (meth)acrylic ester type resins such as (meth)acrylic ester (co)-polymers, (meth)acrylic ester-acrylonitrile copolymers, and (meth)acrylic ester-styrene copolymers; styrene type resins such as styrene polymer, styrene-butadiene copolymer, and styrene-butadiene-acrylonitrile copolymer; polyamide type resins such as poly($\epsilon$-caprolactam) and the condensate of adipic acid and hexamethylene diamine; polyester type resins such as the condensate of terephthalic acid and ehtylene glycol and the condensate of adipic acid and ethylene glycol; polyolefin type resins such as polyethylene, chlorinated polypropylene, carboxylmodified polyethylene, polyisobutylene, and polybutadiene; cellulose derivatives such as cellulose acetate, cellulose propionate, and nitrocellulose; and butyrol resins. These resins are available on the market or obtainable by the conventional method of syntheses.

The thermosetting resin or the reactive resin which is effectively usable as the binder for the coating composition is required to be such that it is enabled, either during or after the formation of a coating, to give rise to a cross-linked structure through addition reaction or condensation reaction by virtue of application of heat, irradiation with an active energy ray, or desiccation. As concrete examples of the thermosetting resin or reactive resin, there can be cited phenol type resins such as novolak resins and resol resins; amino type resins such as uread resin, melamine resin, and benzoguanamine resin; various alkyd resins; unsaturaed polyester resins; curing acrylic type resins; urethane modified resins such as isocyanate group-containing polyesters and isocyanate group-containing polyethers; polyamine type resins, and epoxy resins.

The binder mentioned above must be selected so as to suit the adhesiveness and wettability exhibited to a substrate, and the rigidity, flexibility, chemical resistance, antifouling property, and weatherability required of the coating film. One member or a mixture of two or more members selected from the group of thermosetting resins and reactive resins is used in due consideration of the purpose for which the coating composition is used.

The carbon black-containig coating composition of the present invention contains the aforementioned carbon black-graft polymer and the binder and may be in the form of a mixture containing no solvent, a solution, or a dispersion. It can be obtained by any of the conventional methods. For example, (1) A method which comprises preparing a solution of the binder in a suitable solvent (such as, for example, water, alcohol, acetone, or toluene) and keeping the solution stirred and gradually adding thereto the carbon black-graft polymer.

(2) A method which comprises mixing a dispersion of the binder with the carbon black-graft polymer.

(3) A method which comprises mixing the binder with the carbon black-graft polymer and subsequently adding a suitable solvent to the resultant mixture.

(4) A method which comprises mixing a liquid binder capable of being cured by a suitable method with the carbon black-graft polymer.

(5) A method which comprises carrying out the aforementioned working example of the production of the carbon black-graft polymer while using, as a polymer devoid of reactivity with carbon black, a polymer answering the description of the binder and subsequently adding a suitable solvent to the resultant mixture of the carbon black-graft polymer and the binder.

Though the ratio of the carbon black-graft polymer and the binder to be used in the carbon black-containing coating composition is not specifically restricted, it is proper for the purpose of enabling the carbon black-containing coating composition to manifest the characteristec properties thereof thoroughly without impairing the properties as a coating to limit the amount of carbon black contained in the carbon black-graft polymer to the range of 1 to 300 parts by weight, preferably 5 to 100 parts by weight, based on 100 parts by weight of the binder.

The carbon black-containing coating composition of the present invention may suitably incorporate therein, in addition to the aforementioned components, the conventional additives for coating compositions in amounts out so large as to impair the intended effects of the produced composition. As examples of such additives usable advantageously in the coating composition of this invention, there can be cited metallic soap, dispersion aids such as surfactants, film-forming aids, antistatic agents, defoaming agents, and inorganic filters such as silica, talc, calcium carbonate, and titanium dioxide.

The carbon black-containing coating composition of the present invention comprises the carbon black-graft polymer and the binder. Since the carbon black-graft polymer is highly effective in dispersing the coating composition in a liquid and is excellent in affinity for the binder, the carbon black containing composition enjoys a long shelf stability life and, when applied on a various substrate, produces a coating which possesses a stable antistatic property and a uniform coloring property and excels in wear resistance, resistance to heat, antiblocking property, and lubricity.

The carbon black-graft polymer coating composition of the present invention, therefore, can be advantageously used to coat various substrates such as molded plastic articles, metal articles, wood, paper, and inorganic materials for the purpose of protecting and modifying the surfaces of such substrates.

The carbon black-graft polymer can be used as a carbon black dispersion. The carbon black dispersion of the present invention contains a carbon black-graft polymer having a polymer (A) reactive with carbon black grafted on to the surface of carbon black. The polymer (A) possesses a very high grafting ratio to carbon black as compared with that which is common to the conventional grafting method and binds itself very strongly to the surface of carbon black. Further, the polymer is allowed to possess a backbone selected from a wide variety of backbones. Thus, the polymer (A) is capable of freely, effectively, and economically modifying the surface properties of carbon black so as to suit the particular dispersion solvent to be used or the purpose for which the produced dispersion is used. The amount of the carbon black-graft polymer to be dispersed is in the range of 1 to 80% by weight, preferably 5 to 60% by weight, based on the amount of the dispersion. The carbon black dispersion of the present invention, therefore, has carbon black homogeneously dispersed microscopically therein and is useful as a coloring agent in various applications. The carbon black dispersion, either in the unmodified form or in a form combined suitably with necessary components, can be used as an ink of highly stable dispersibility and richly coloring property in water or oil writing devices, data recording devices, or printing devices. Further, the carbon black dispersion of the present invention can be used as toning pigment pastes (black toner) for inks, coating materials, and plastics. It can be easily dispersed in inks, coating materials, and plastics without impairing the properties thereof.

The carbon black-graft polymer can be used as a rubber composition. As the rubber component for the rubber composition of the present invention, one member or a mixture of two or more members from the group consisting of rubbers such as natural rubber (NR), styrene-butadiene rubber (SBR), polybutadiene rubber (BR), polyisoprene rubber (IR), chloroprene rubber (CR), nitrile rubber (NBR), butyl rubber (IIR), ethylene-propylene rubber (EPM, EPDM), silicone rubber, fluorine rubber, and epichlorohydrin rubber (CHR), and styrene-butadiene type thermoplastic elastomers.

The rubber composition of the present invention is produced by the incorporation of a carbon black-graft polymer in a rubber component. For this production, it suffices to select the amount of the carbon black-graft polymer in the range of 1 to 90% by weight, preferably 10 to 70% by weight, based on the total amount of the rubber composition. If the amount of the carbon black-graft polymer to be added is unduly small, the effect of carbon black manifested in reinforcing the rubber is not sufficient so that the produced rubber composition permits production of shaped articles of high mechanical properties only with difficulty. Conversely if the amount is unduly large, the produced rubber composition poses problems concerning the kneadability and the mechanical properties. When the amount of the carbon black graft-polymer to be added is selected within the aforementioned range, the rubber composition can be vested with the antistatic property and electroconductivity suitable for the purpose for which the rubber composition is used.

The rubber composition of the present invention may incorporate therein conventional additives such as reinforcing agent, filler, vulcanizer, vulcanization aid, vulcanization accelerator, softening agent, plasticizer, pigment, antioxidant, and ultra-violet absorbent to suit occasion. the amounts of these additives to be used, the sequence of their addition, and the manner of their addition are matters for free choice and need not be specifically restricted.

The rubber composition of the present invention can be given any of the treatments such as vulcanization normally adopted in the processing of rubber compounds. These treatments are not specifically restricted.

Owing to the incorporation of the carbon black-graft polymer, the rubber composition of the present invention is excellent in kneadability, appearance of shaped products thereof, and mechanical properties. The rubber composition of the present invention, therefore, can be effectively used in applications as to tires, belts, rolls, tubes, sandals, electric cables, mechanical articles, and industrial parts.

Since the carbon black-graft polymer is very easily dissolved and dispersed in the binder component of ink, it permits production of a thermographic transfer ink having carbon black homogeneously dispersed microscopically therein. As examples of the binder component of the thermographic transfer ink, there can be cited natural and synthetic waxes such as carnaruba wax, montan wax, paraffin wax, microcrystalline wax, oxide wax, low molecular polyethylene wax, and low molecular polypropylene wax; and synthetic resins such as polysulfon ether, polycarbonates, polystyrene, silicone resin, and acrylic type resins.

The dispersion of the carbon black-graft polymer in the binder component is very easily attained by merely mixing the two components under weak shear force with a stirring device such as, for example, a stirrer provided with blades of a varying shape, a static mixer, or a melt mixer. This dispersion does not require a kneading action produced under strong shear force with a kneading device such as a ball mill or a roll mill. Optionally, this dispersion may be accomplished by causing the reaction of carbon black with the polymer (A) to proceed in the presence of the binder of the ink. In this manner, the thermographic transfer ink can be produced in a single process. When the polymer (A) itself is selected so as to serve effectively as the binder for the ink, the carbon black-graft polymer can be used directly as the thermographic transfer ink without requiring incorporation therein of any other binder. Though the amount of carbon black in the thermographic transfer ink is not specifically restricted, it is generally selected in the range of 1 to 40% by weight, preferably 5 to 30% by weight. The thermographic transfer ink may incorporate other wellknown additives, when necessary, in addition to the components mentioned above.

The thermographic transfer ink of the present invention can be applied by any of the conventional devices such as hot melt coater, reverse roll coater, and gravure roll coater on any of the substrates represented by PET film, polyimide film, condenser paper, silk cloth, and aluminum foil to produce thermographic transfer ink sheets of highly desirable quality.

The thermographic transfer ink of the present invention contains a carbon black-graft polymer having the polymer (A) reactive with carbon black grafted on to the surface of carbon black. The polymer (A) possesses a very high grafting ratio to carbon black as compared with that which is common to the conventional grafting method and binds itself very strongly to the surface of carbon black. Further, the polymer is allowed to possess a backbone selected from a wide variety of backbones. Thus, the polymer (A) is capable of freely, effectively, and economically modifying the surface properties of carbon black so as to suit the binder component of the ink to be used. Thus, the carbon black-graft polymer of the present invention is extremely uniformly dispersed microscopically in the binder component of the thermographic transfer ink and the carbon black and the binder component of the ink exhibit very high affinity for each other through the medium of the polymer (A). The images recorded with the thermographic transfer ink of the present invention, therefore, possess very high quality and enjoy outstanding durability.

Yet another use found for the carbon black-graft polymer is as a coating agent for the thermographic transfer ink ribbon. Examples of the binder component for the ribbon coating agent include various known resins such as vinyl chloride polymer, vinyl chloride-vinyl acetate copolymer, acrylic type resins, styrene polymer, polyurethane resins, and polyester resins. The ribbon coating agent is obtained by adding carbon black-graft polymer to the binder component of the kind mentioned above and thoroughly stirring the resultant mixture. The proportion of carbon black-graft polymer to be added to the coating agent is in the range of 1 to 60% by weight, preferably 5 to 40% by weight, based on the amount of the coating agent. The ribbon coating agent which is consequently obtained is applied on a substrate with any of the conventional devices such as roll coater, air knife coater, air doctor coater, and spray coater, to give rise to a ribbon coating layer on the rear side thereof.

The carbon black-graft polymer in accordance with the present invention is uniformly dispersed microscopically in a backcoat layer, and excels in wear resistance without falling out of the carbon black.

The carbon black-graft polymer is very easily dissolved and dispersed in the back coating agent and, therefore, permits production of a back coating agent having carbon black uniformly dispersed microscopically therein. Examples of the binder component in the back coating agent for use on the magnetic recording medium include vinyl cycloride type resins, vinyl chloride-vinyl acetate copolymer type resins, acrylic type resins, styrene type resins, polyurethane type resins, and polyester type resins. The carbon black-graft polymer of the present invention can otherwise be dispersed in a solvent to produce a back coating agent without use of the binder component. The solution or dispersion of the carbon black-graft polymer in the binder component and/or the solvent is generally attained simply by stirring the carbon black-graft polymer, the binder component, and/or the solvent at room temperature for a period of several minutes to some tens of minutes. It may be effected, when necessary, by kneading and dispersing the aforementioned components by the use of a roll mill, a sand mill, a ball mill, a supersonic dispersing machine, a disperser, or a homogenizer. The amount of the carbon black-graft polymer to be incorporated in the back coating agent is in the range of 1 to 60% by weight, preferably 5 to 40% by weight. The back coating agent thus produced is applied on a substrate with any of the known devices such as roll coater, air knife coater, air doctor coater, and spray coater, to give rise to a back coating layer on the rear side thereof.

Examples of the substrate to be used in the magnetic recording medium of the present invention include films, sheets, and tapes of polyester, cellulose acetate, and polyvinyl chloride. The magnetic recording layer can be formed by applying a coating agent containing a known magnetic powder or by vacuum depositing a magnetic substance, for example.

The magnetic recording medium of the present invention is provided with a back coating layer containing a carbon black-graft polymer having the polymer (A) reactive with carbon black grafted on to the surface of carbon black. The polymer (A) possesses a very high grafting ratio to carbon black as compared with that which is common to the conventional grafting method and binds itself very strongly to the surface of carbon black. Further, the polymer is allowed to possess a backbone selected from a wide variety of backbones. Thus, the polymer (A) is capable of freely, effectively, and economically modifying the surface properties of carbon black so as to suit the back coating agent to be used. The carbon black-graft polymer of the present invention is uniformly dispersed microscopically in the back coating layer and the carbon black and the binder component come into close mutual contact. As the result, the back coating layer is extremely robust, does not suffer separation of carbon black, and excels in wear resistance. Since the magnetic recording medium of the present invention is thus provided with a back coating layer of robust texture, it entails very little degradation of quality even after repeated use over a protracted period.

Now, the present invention will be described more specifically below with reference to working examples. It should be noted, however, that the present invention is not limited by these examples. Wherever the terms "part" and "percentage (%)" are mentioned, they are invariably meant respectively as "part by weight" and "% by weight.".

EXAMPLE 1

A flask provided with a stirrer, an inert gas inlet tube, a reflux condenser, and a thermometer was charged with 400 parts of deionized water having 0.2 part of polyvinyl alcohol dissolved therein. The flask was then charged with a mixture prepared in advance by dissolving 16 parts of benzoyl peroxide in a polymerizable monomer consisting of 196 parts of styrene and 4 parts of isopropenyl oxazoline. The contents of the flask were stirred at high rate to form a homogeneous suspension. Then the suspension, with nitrogen gas kept blown therein, was heated to 80° C. and stirred at this temperature for 5 hours to effect polymerization reaction and subsequently cooled to produce a polymer suspension. This polymer suspension was separated by filtration, washed, and then dried. Consequently, there was obtained a polymer possessing an oxazoline group as a reactive group. The molecular weight, Mn, of this polymer, by the GPC test, was found to be 5,800.

In a mill (produced by Toyo Seiki KI.KI. and marketed under trademark designation of "Laboplastomill"), 40 parts of the polymer possessing an oxazoline group as a reactive group and 20 parts of carbon black (produced by Mitsubishi Chemical Industries, Ltd. and marketed under trademark designation of "Carbon Black MA-600") were kneaded at 160° C. for 20 minutes at a rate of 100 rpm to effect reaction, then cooled, and pulverized, to produce a carbon black-graft polymer (1).

EXAMPLE 2

The same flask as used in Example 1 was charged with 200 parts of toluene and 200 parts of methyl isobutyl ketone. The contents of the flask, with nitrogen gas kept blown therein, was heated to 80° C. To the heated contents of the flask, a mixture prepared in advance by dissolving 4 parts of benzoyl peroxide in a polymerizable monomer consisting of 190 parts of styrene and 10 parts of 2-(1-azyridinyl)ethyl methacrylate was added dropwise through a dropping funnel over a period of 2 hours. The resultant mixture was further stirred for 5 hours to effect polymerization reaction and then cooled, to produce a polymer solution. In 2,000 parts of methanol, 100 parts of this polymer solution was reprecipitated. The precipitate was removed and dried, to produce a polymer possessing an aziridine group as a reactive group. The molecular weight, Mn, of this polymer, by the GPC test, was found to be 3,000.

By following the procedure of Example 1, 20 parts of the polymer possessing an aziridine group as a reactive group was caused to react with 20 parts of polystyrene (a product of Asahi Chemical Industry Co., Ltd. having a molecular weight, Mn, of 4,000 and marketed under trademark designation of "Styron-666") and 20 parts of the same carbon black as used in Example 1. The resultant reaction mixture was cooled and pulverized to produce a carbon black-graft polymer (2).

EXAMPLE 3

A polymer possessing an N-hydroxyalkylamide group as a reactive group was obtained by following the procedure of Example 1, excepting 95 parts by weight of styrene, 3 parts of n-butyl acrylate, and 2 parts of hydroxyethyl methacrylamide were used instead as polymerizable monomer.

The molecular weight, Mn, of this polymer, by the GPC test, was found to be 6,200.

In the same mill as used in Example 1, 44 parts of the polymer possessing an N-hydroxyalkylamide group as a reactive group and 20 parts of carbon black (MA-600) were kneaded at 180° C. for 40 minutes at a rate of 100 rpm to effect reaction, then cooled, and pulverized, to produce a carbon black-graft polymer (3).

EXAMPLE 4

The same flask as used in Example 1 was charged with 460 parts of cyclohexane and 2 parts of a substance (produced by Kao Co., Ltd. and marketed under trademark designation of "Leodol SP-S10). The contents of the flask, with nitrogen gas kept blown therein, were heated to 75° C. To the heated contents of the flask, a mixture prepared in advance by adding 140 parts of deionized water and 2 parts of ammonium persulfate to a polymerizable monomer consisting of 60 parts of acrylamide, 15.2 parts of N-vinyl pyrrolidone, and 1.6 parts of N-hydroxyethyl methacrylamide was added dropwise through a dropping funnel over a period of 1.5 hours. The resultant mixture was stirred further for 0.5 hour to effect polymerization reaction. The polymerization product was cooled, then stripped of cyclohexane, and dried at temperature of 80° to 100° C. under a vacuum, to produce a polymer possessing a N-hydroxyalkylamide group as a reactive group. The molecular weight, Mn, of this polymer, by the GPC test, was found to be 12,000.

By following the procedure of Example 1, 45 parts of the polymer possessing an N-hydroxyalkylamide group as a reactive group was caused to react with 15 parts of carbon black (produced by Mitsubishi Chemical Industries, Ltd. and marketed under trademark designation of "Carbon Black MA-100R"). The resultant reaction mixture was cooled and pulsverized to produce a carbon black-graft polymer (4).

EXAMPLE 5

The same flask as used in Example 1 was charged with 217 parts of toluene. The toluene in the flask, with nitrogen gas kept blown therein, was heated to 90° C. To the heated toluene in the flask, a mixture prepared in advance by dissolving 5.44 parts of thioglycolic acid and 1.32 parts of azobisisobutyronitrile in a polymerizable monomer consisting of 480 parts of styrene and 20 parts of n-butyl acrylate was added dropwise through a dropping funnel over a period of 2 hours. The resultant mixture was further stirred for 5 hours to effect polymerization reaction. The molecular weight, Mn, of this polymer, by the GPC test, was found to be 9,500.

Then, 185.1 parts of the reaction product (a solution containing a prepolymer possessing a terminal carboxyl group) was caused to react with 2.95 parts of 2-p-phenylene-bis-2-oxazoline added thereto at 80° C. for 2 hours, to produce a solution (involatile content 70%) of a polymer possessing a terminal oxazoline group as a reactive group.

In the same mill as used in Example 1, 57.1 parts of the solution (involatile content 70%) of the polymer possessing a terminal oxazoline group and 20 parts of the same carbon black as used in Example 4 were kneaded at 160° C. for 20 minutes at a rate of 100 rpm to effect reaction. The resultant reaction product was stripped of the solvent, then cooled and pulverized to produce a carbon black-graft polymer (5).

EXAMPLE 6

An autoclave provided with a stirrer, a thermometer, and an ethylene oxide feed unit was charged with 32 parts of methanol and 0.35 part of sodium hydroxide. The contents of the autoclave were heated to 110° C. and kept stirred and maintained under pressure controlled between 5 and 8 kg/cm$^2$. To the heated and stirred, the contents of the autoclave, 88 parts of ethylene oxide was added dropwise. The resultant mixture was left aging for 30 minutes and then heated to elevate the reaction temperature to 150° C. To the heated mixture, 352 parts of ethylene oxide was added drpopwise over a period of 5 hours. Thereafter, the resultant mixture was left standing for 1 hour, to obtain a 10-mol adduct of ethylene oxide possessing one methoxylated terminal. In the same autoclave as used above, 47.2 parts of the 10-mol adduct of uniterminally methoxylated ethylene oixde and 0.62 part of sodium hydroxide were heated to 150° C. and 616 parts of ethylene oxide was added dropwise thereto over a period of 5 hours. Then, the resultant reaction was left aging for 1 hour to complete the polymerization and produce uniterminally methoxylated polyethylene glycol.

In the same autoclave as used above, 400 parts of distilled water, 100 parts of the uniterminally methoxylated polyethylene glycol, and 10 parts of a platinum/palladium type catalyst were kept at a temperature in the range of 90° to 95° C. and, with compressed air added from time to time maintain the internal pressure at 10 kg/cm$^2$, the contents of the autoclave were stirred for 30 hours to effect reaction. Consequently, there was obtained an aqueous solution of polyethylene glycol possessing an acid number of 8.4 and modified at one terminal thereof with a methoxy group and the other terminal with a carboxyl group. the molecular weight, Mn, of this polymer, by the GPC test, was found to be 6,600. This aqueous solution of modified polyethylene glycol had the solvent thereof displaced with diethylene glycol and then was adjusted to a volatile content of 33.3%. In the same flask as used in Example 1, 300 parts of the diethylene glycol solution of uniterminally carboxyl-modified polyethylene glycol was heated to 50° C. To the heated diethylene glycol solution, 1.70 parts of 2-(1-aziridinyl)-2-oxazoline was added dropwise thereto through a dropping funnel over a period of 30 minutes. The resultant mixture was left reacting for 5 hours and then cooled, to produce a solution (involatile content 33.7%) of a polymer possessing a uniterminal oxazoline group as a reactive group.

In the same flask as used in Example 1, 90 parts of the solution of the polymer possessing an oxazoline group as a reactive group and 30 parts of carbon black (product of Mitsubishi Chemical Industry Co., Ltd. and marketed under trademark designation of "Carbon Black #45") were left reacting with each other at 100° C. for 5 hours, to produce a diethylene glycol solution of carbon black-graft polymer (6).

EXAMPLE 7

In the same flask as used in Example 1, 200 parts of a terminal carboxyl group-containing linear saturated polyester (a product of Nippon Shokubai Kagaku Kogyo Co., Ltd. possessing a molecular weight, Mn, of 6,000 and an involatile content of 50%, marketed under trademark designation of "Aroplaz OB-63") and 3.60 parts of 2-p-phenylene-bis-2-oxazoline were left reacting at 110° C. for 2 hours, to produce a solution (involatile content 50%) of a polymer possessing a terminal oxazoline group as a reactive group. Under the same conditions as in Example 5, 80.0 parts of the solution (involatile content 50%) of the polymer possessing a terminal oxazoline group and 20 parts of the same carbon black as used in Example 4 were kneaded to effect reaction, to produce a carbon black-graft polymer (7).

CONTROL 1

In the same flask as used in Example 1, 48 parts of styrene and 12 parts of the same carbon black as used in Example 1 were heated to 140° C., with nitrogen gas kept blown therein, and kept stirred at this temperature for 5 hours to effect polymerization reaction and then cooled. The resultant reaction product was combined with 300 parts of toluene and reprecipitated in 7000 parts of methanol, to produce a carbon black-graft polymer (1) for comparison. This carbon black-graft polymer (1) for comparison was composed of 100 parts of carbon black component and 250 parts of polystyrene component.

CONTROL 2

Under the same conditions as in Example 1, 45 parts of the same polystyrene possessing no reactive group as used in Example 2 and 15 parts of the same carbon black as used in Example 1 were kneaded, then cooled, and pulverized, to produce a carbon black-graft polymer (2) for comparison in which the carbon black component and the polymer component were not substantially bonded to each other.

EXAMPLE 8

The carbon black-graft polymers (1) through (7) and the carbon black-graft polymers (1) and (2) for comparison obtained in Examples 1 through 7 and Controls 1 and 2 were tested for dispersibility in toluene and water. The results were as shown in Table 1.

TABLE 1

|  | Amount (parts) of polymer per 100 parts of carbon black | Dispersion in toluene (Note 1) | Dispersion in water (Note 1) |
|---|---|---|---|
| Example 1 | 200 | good | — |
| 2 | 200 (Note 2) | good | — |
| 3 | 220 | good | — |
| 4 | 300 | — | good |
| 5 | 200 | good | — |
| 6 | 100 | — | good |
| 7 | 200 | good | — |
| Control 1 | 250 | bad | — |
| 2 | 300 | bad | — |
| 3 | 0 | bad | bad |
| (Note 3) |  |  |  |

(Note 1) The condition of dispersion was evaluated with respect to a dispersion having a carbon black content of 5%.
(Note 2) Of the total of 200 parts of the polymer, a polymer possessed of a reactive group accounted for 100 parts.
(Note 3) Control 3 represents an experiment exclusively using the same carbon black as in Example 4.

EXAMPLE 9

A flask provided with a stirrer, an inert gas inlet tube, a reflux condenser, and a thermometer was charged with 400 parts of deionized water having 0.2 part of polyvinyl alcohol dissolved therein. The flask was further charged with a mixture prepared in advance by dissolving 16 parts of benzoyl peroxide in a polymerizable monomer consisting of 194.9 parts of styrene and 5.1 parts of glycidyl methacrylate. The contents of the flask were stirred at a high rate to form a homogeneous suspension. Then the suspension, with nitrogen gas kept blown therein, was heated to 80° C., stirred at this temperature for 5 hours to effect polymerization reaction, and then cooled, to produce a polyemr suspension.

This polymer suspension was separated by filtration, washed, and then dried, to produce a polymer possessing one epoxy on the average as a reactive group in the molecular unit thereof. The molecular weight, Mn, of this polymer, by the GPC test, was found to be 5,500.

In the same mill as used in Example 1, 40 parts of the polymer possessing one epoxy group on the average as a reactive group in the molecular unit and 20 parts of the same carbon black as used in Example 4 were kneaded at 160° C. for 60 minutes at a rate of 100 rpm under a torque value of 1 kg.m per 50 cc to effect reaction and then cooled and pulverized, to produce a carbon black-graft polymer (8).

EXAMPLE 10

The same flask as used in Example 9 was charged with 400 parts of deionized water having 0.2 part of polyvinyl alcohol dissolved therein. It was further charged with a mixture prepared in advance by dissolving 16 parts of benzoyl peroxide in a polymerizable monomer consisting of 100 parts of methyl methacylate, 94.3 parts of butyl acrylate, and 5.7 parts of 2,3-epithiopropyl methacrylate. Then the contents of the flask were stirred at high rate to product a homogeneous suspension. Then, the suspension, with nitrogen gas kept blown therein, was heated to 80° C. and kept stirred at this temperature for 5 hours to effect polymerization reaction and subsequently cooled, to produce a polymer suspension. This polymer suspension was separated by filtration, washed, and then dried to produce a polymer possessing one thioepoxy group on the average as a reactive group in the molecular unit. The molecular weight, Mn, of this polymer, by the GPC test, was found to be 5,800.

In the same procedure as in Example 9, 20 parts of the polymer possessing one thioepoxy group on the average as a reactive group in the molecular unit, 20 parts of the same polystyrene as used in Example 2 and 20 parts of the same carbon black as used in Example 9 were allowed to react with each other. The resultant reaction mixture was cooled and pulverized to produce a carbon black-graft polymer (9).

EXAMPLE 11

In an autoclave provided with a stirrer, a thermometer, and an ethylene oxide feed unit, 32 parts of methanol and 0.35 part of sodium hydroxide were heated to 110° C., kept stirred, and maintained under pressure controlled between 5 and 8 kg/cm$^2$. To the heated and stirred solution, 88 parts of ethylene oxide was added dropwise. The resultant mixture was left aging at for 30 minutes, heated further to 150° C. and 352 parts of ethylene oxide was added dropwise thereto. Thereafter, the resultant mixture was left aging for 1 hour, to produce a 10-mol adduct of uniterminally methoxylated ethylene oxide. In the same autoclave as used above, 47.2 parts of the 10-mol adduct of a uniterminally methoxylated ethylene oxide and 0.62 part of sodium hydroxide were heated to 150° C. To the heated mixture in the autoclave, 616 parts of ethylene oxide was added dropwise. The resultant mixture was left aging for 1 hour to complete polymerization and produce a uniterminally methoxylated polyethylene glycol.

In the same flask as used in Example 9, 663 parts of the uniterminally methoxylated polyethylene glycol obtained by the reaction mentioned above and 4.3 parts of sodium hydroxide were heated to 60° C. The contents of the flask were kept stirred and 10.0 parts of epichlorohydrin was quickly added thereto. Then, the resultant mixture was heated to 95° C. and left aging at this temperature for 2 hours, to produce a polymer possessing a terminal epoxy group as a reactive group. The molecular weight, Mn, of this polymer, by the GPC test, was found to be 6,600. The polymer possessing a uniterminal epoxy group as a reactive group was dissolved in diethylene glycol, to produce a solution having an involatile content of 33.3%.

In the same flask as used in Example 9, 90 parts of the solution and 30 parts of carbon black (produced by Mitsubishi Chemical Industry Co., Ltd. and marketed under trademark designation of "Carbon Black MA-7") were left reacting at 150° C. for 5 hours, to produce a diethylene glycol solution of a carbon black-graft polymer (10).

EXAMPLE 12

44 part of a polymer possessing one epoxy group as a reactive group in the molecular unit (produced by Nagase Chemical Industry Co., Ltd. and marketed under trademark designation of "Denacol EX-1") and 20 parts of carbon black (MA-100R) were caused to react with each other in the same manner as in Example 9. The resultant reaction mixture was cooled and then pulverized to produce a carbon black (11).

EXAMPLE 13

In the same flask as used in Example 9, 100 parts polybutadiene (a product of Nippon Soda Co., Ltd. having a molecular weight, Mn, of 3,000 and marketed under trademark designation of "NISSO-PB B-3000") was dissolved in 300 parts of benzene. The resultant solution in the flask was kept vigorously stirred at a temperature in the range of 30° to 35° C. and 100 parts of 4% peracetic acid was added dropwise thereto. The resultant mixture was left reacting for 2 hours. The reaction mixture was washed first with water, then with an aqueous 5% caustic soda solution, and again with water and distilled under a vacuum to expel benzene, to produce a polymer possessing one epoxy group on the average as a reactive group in the molecular unit.

Then, 45 parts of the polymer possessing one epoxy group on the average as a reactive group in the molecular unit and 15 parts of the same carbon black as used in Example 11 were caused to react with each other in the same manner as in Example 9. The resultant reaction mixture was cooled and then pulverized to produce a carbon black-graft polymer (12).

EXAMPLE 14

By the procedure of Example 9, 40 parts of the polymer possessing an epoxy group as a reactive group and synthesized in Example 9 and 20 parts of the same carbon black as used in Example 1 were caused to react with each other. The resultant reaction mixture was cooled and pulverized, to produce a carbon black-graft polymer (13).

EXAMPLE 15

The same flask as used in Example 9 was charged with 400 parts of deionized water having 0.2 part of polyvinyl alcohol dissolved therein and further charged with a mixture prepared in advance by dissolving 16 parts of benzoyl peroxide in a polymerizable monomer consisting of 189.9 parts of styrene and 10.2 parts of glycidyl methacrylate. The resultant mixture was stirred at high rate to produce a homogeneous suspension. Then, the suspension, with nitrogen gas kept blown therein, was heated to 80° C., kept stirred at the same temperature for 5 hours to effect polymerization reaction, and then cooled to produce a polymer suspension. This polymer suspension was separated by filtration, washed and then dried to produce a polymer possessing two epoxy groups on the average as reactive groups in the molecular unit. The molecular weight, Mn, of this polymer, by the GPC test, was found to be 5,500.

In the same manner as in Example 9, 40 parts of the polymer possessing two epoxy groups on the average as reactive groups in the molecular unit and 20 parts of the same carbon black as used in Example 4 were caused to react with each other, cooled, and pulverized to produce a carbon black-graft polymer (14).

CONTROL 3

In the same manner as in Example 9, 45 parts of the same polystyrene possessing no reactive group as used in Example 10 and 15 parts of the same carbon black as used in Example 4 were kneaded, then cooled, and pulverized to produce a carbon black-graft polymer (3) for comparison wherein the carbon black component and the polymer component were not substantially bonded to each other.

CONTROL 4

The same flask as used in Example 9 was charged with 400 parts of deionized water having 0.2 parts of polyvinyl alcohol dissolved therein and was further charged with a mixture prepared in advance by dissolving 16 parts of benzoyl peroxide in a polymerizable monomer consisting of 149 parts of styrene and 51 parts of glycidyl methacrylate. The resultant mixture was stirred at high rate to produce a homogeneous suspension. Then, the suspension, with the nitrogen gas kept blown therein, was heated to 80° C., kept stirred at this temperature for 5 hours to effect polymerization reaction, and then cooled, to produce a polymer suspension. This polymer suspension was separated by filtration, washed, and then dried to produce a polymer possessing an epoxy group as a reactive group. The molecular weight, Mn, of this polymer, by the GPC test, was found to be 5,000.

In the same mill as used in Example 1, 40 parts of a polymer possessing 10 epoxy groups on the average as reactive groups in the molecular unit and 20 parts of the same carbon black as used in Example 4 were kneaded at 160° C. at a rate of 100 rpm to effect reaction, then cooled, and pulverized to produce a carbon black-graft polymer (4) for comparison.

EXAMPLE 16

The carbon black-graft polymers (8) through (14) and the carbon black-graft polymers (1), (3), and (4) for comparison obtained respectively in Example 9 through 15 and Controls 1, 3, and 4 were tested for dispersibility in toluene and water. The results were as shown in Table 2.

TABLE 2

|  | Amount (parts) of polymer per 100 parts of carbon black used | pH of carbon black | Dispersibility in toluene (Note 1) | Dispersibility in water (Note 1) |
| --- | --- | --- | --- | --- |
| Example 9 | 200 | 3.5 | O | — |
| Example 10 | 200 (Note 2) | 3.5 | O | — |
| Example 11 | 100 | 3.0 | — | O |
| Example 12 | 220 | 3.5 | — | O |
| Example 13 | 300 | 3.0 | O | — |
| Example 14 | 200 | 7.5 | Δ | — |
| Example 15 | 200 | 3.5 | Δ | — |
| Control 1 | 250 | 3.5 | X | — |
| Control 3 | 300 | 3.5 | X | — |
| Control 4 | 200 | 3.5 | X | — |
| Referential Experiment (Note 3) | 0 | 3.5 | X | X |

(Note 1) The condition of dispersion was rated with respect to a dispersion possessing a carbon black content of 5%. The rating was made on the three-point scale, wherein the circle (O) stands for highly desirable dispersion evinced by absence of conglomeration, the triangle (Δ) for presence of slight conglomeration, and the cross (X) for poor dispersion evinced by conglomeration of substantially all solid particles and sedimentation of carbon black on the bottom of the container.
(Note 2) In the total of 200 parts of polymer a polymer possessing reactive group accounted for 100 parts.
(Note 3) Referential Experiment represents a case of exclusive use of the same carbon black as in Example 4.

EXAMPLE 17

In a Henschel mixer, 30 parts of the carbon black-graft polymer (1) obtained in Example 1, 70 parts of a styrene-butyl methacrylate copolymer (produced by Sanyo Chemical Indsutries Co., Ltd. and marketed under trademark designation of "Himer SBM 73"), and 2 parts of a charge control agent (product of Hodogaya Chemical Co., Ltd. and marketed under trademark designation of "Aizen Spiron Black TRH") were stirred and, then in a roll mill, they were kneaded at 160° C. for 20 minutes. The resultant mixture was cooled and coarsely pulverized with a continuous vibration mill. Subsequently, the coarse powder was finely pulverized with a jet mill and classified to obtain a toner (1) 3 to 15 μm in particle diameter for the development of electrostatic charge images. A developing agent (1) was obtained by uniformly mixing 5 parts of the toner (1) mentioned above with 95 parts of iron powder 50 to 80μ in average particle diameter as a carrier.

In a copying machine (produced by Ricoh Company Ltd. and marketed under trademark designation of "Ricopy FT-4630"), this developing agent was used to develop a latent image. Consequently there was obtained as developed image with clear outlines and very sharp contrast. From this developed image, more than 200,000 copies of substantially the same desirable quality were produced.

EXAMPLE 18

A toner (2) 5 to 15 μm in particle diameter for the development of electrostatic charge images was obtained by repeating the procedure of Example 17, excepting 30 parts of the carbon black-graft polymer (8) obtained in Example 9, 70 parts of a styrene type resin (produced by Esso Petro-Chemical Co., Ltd. and marketed under trademark designation of "Picorastic D-125"), and 2 parts of the same charge control agent as used in Example 17 were used instead during the mixing in the Henschel mixer. From this toner (2), a developing agnet (2) was produced similarly.

In the same test as in Example 17, this developing agent (2) produced a visible image of clear outlines and very sharp contrast. From this developed image, more than 200,000 copies of substantially the same desirable quality were produced.

EXAMPLE 19

A toner (3) 5 to 15 microns in particle diameter for the development of electrostatic charge images was obtained by repeating the procedure of Example 17, excepting 30 parts of the carbon black-graft polymer (9) obtained in Example 10, 70 parts of an epoxy resin (produced by Shell Chemicals Inc. and marketed under trademark designation of "Epon 1004"), and 2 parts of the same charge control agent as ued in Example 17 were used instead during the mixing with the Henschel mixer. A developing agent (3) was produced similarly from the toner (3).

In a copying machine (produced by Mita Industrial Company, Ltd. and marketed under product code of "DC-113"), this developing agent (3) was used to develop a latent image. Consequently, there was obtained a visible image of clear outlines and very sharp contrast. From this developed image, there were obtained more than 200,000 copies of substantially the same desirable quality.

EXAMPLE 20

A toner (4) 5 to 15 microns in particle diameter for the development of electrostatic charge images was obtained by repeating the procedure of Example 17, excepting 30 parts of the carbon black-graft polymer (2) obtained in Example 2, 68.5 parts of the same styrene-butyl methacrylate copolymer as used in Example 17, 1.5 parts of a low molecular polyethylene (produced by Mitsui Petrochemical Industries, Ltd. and marketed under trademark designation of "Mitsui Hi-wax 4052E"), and 3 parts of a charge control agent (produced by Orient Chemical Industries Ltd. and marketed under the trademark designation of "Bontron S-32") were used instead during the mixing in the Henschel mixer. From this toner (4), a developing agent (4) was produced similarly.

When this developing agent (4) was subjected to the same evaluation as in Example 19, there was obtained a developed image with clear outlines and very sharp contrast. From this developed image, more than 200,000 copies of substantially the same desirable quality were obtained.

EXAMPLE 21

A toner (5) 5 to 17 microns in particle diameter for the development of electrostatic charge images was obtained by repeating the procedure of Example 17, excepting 30 parts of the carbon black-graft polymer (5) obtained in Example 5, 40 parts of a polyester resin (produced by Dai-Nippon Ink & Chemicals, Inc. and marketed under trademark designation of "PLASDIC-S1001"), 30 parts of the same styrene-butyl methacrylate copolymer as ued in Example 17, and 2 parts of the same charge control agent as used in Example 17 were used instead during the mixing in the Henschel mixer.

From this toner (5), a developing agent (5) was similarly prepared. When this developing agent was subjected to the same test as in Example 17, there was obtained a developed image with clear outlines and very sharp contrast. From this developed image, more than 200,000 copies of substantially the same desirable quality.

EXAMPLE 22

A toner (6) 6 to 18 microns for the development of electrostatic charge images was obtained by repeating the procedure of Example 17, excepting 40 parts of the polystyrene-containing carbon black-graft polymer (7) obtained in Example 7, 60 parts of the same styrene-butyl methacrylate copolymer as used in Example 17, and 2 parts of the same charge control agent as used in Example 17 were used instead during the mixing in the Henschel mixer. From this toner (6), a developing agent (6) was similarly prepared.

When this developing agent (6) was subjected to the same test as in Example 19, there was obtained a developed image with clear outlines and very sharp contrast. From this developed image, more than 200,000 copies of substantially the same desirable quality were produced.

EXAMPLE 23

A toner (7) 5 to 15 microns in particle diameter for the development of electrostatic charge images was obtained by kneading 90 parts of the polymer possessing an oxazoline group as a reactive group and obtained in Example 1, 10 parts of the same carbon black as used in Example 1, and 2 parts of the same charge control agent as used in Example 17 in the same mill as used in Example 1 at 160° C. at a rate of 100 rpm to effect reaction, then cooling the resultant reaction mixture, and pulverizing and classifying the resultant mixture.

A developing agent (7) was prepared by uniformly mixing 3 parts of the toner (7) mentioned above with 97 parts of a ferrite type carrier 50 to 80 μm in particle diameter. When this developing agent (7) was subjected to the same test as in Example 17, there was obtained a developed image with clear outlines and very sharp contrast. From this developed image, more than 200,000 copies of substantially the same desirable quality were produced.

EXAMPLE 24

A toner (8) 5 to 15 microns in particle diameter for the development of electrostatic charge images was obtained by repeating the procedure of Example 23, excepting 20 parts of the polymer possessing an epoxy group as a reactive group and obtained in Example 9, 10 parts of the same carbon black as used in Example 4, 70 parts of the same styrene-butyl methacrylate copolymer as used in Example 17, and 3 parts of the same charge control agent as used in Example 17 were used instead during the mixing in the same mill as used in Example 23. A developing agent (8) was prepared by uniformly mixing 4 parts of toner (8) mentioned above and 96 parts of iron powder carrier. When this developing agent (8) was subjected to the same test as in Example 19, there was obtained a developed image with very sharp contrast. From this developed image, more than 200,000 copies of substantially the same desirable quality were produced.

EXAMPLE 25

In a blender, 30 parts of the carbon black-graft polymer (8) obtained in Example 9, 70 parts of the same styrene-butyl methacrylate copolymer as used in Example 17, 2 parts of the same charge control agent as in Example 17, and 40 parts of a magnetic powder (produced by Toda Industry Co., Ltd, and marketed under trademark designation of "Ferrite EPT-500") were thoroughly mixed and, then in a roll mill, they were heated and kneaded at 150° C. for 15 minutes. The resultant mixture was cooled, coarsely pulverized with a hammer mill, and finely pulverized in an air jet type fine pulverizer and classified in draft to obtain a powder 8 to 25 μm in particle diameter. A one-component magnetic toner was produced by mixing this powder with 0.4 part of hydrophobic colloidal silica (produced by Japan Aerosol Co., Ltd. and marketed under product code of "R-972") in a sample mill.

When the one-component magnetic toner was used in a commercially available copying machine (produced by Canon Inc. and marketed under product code of "NP-150"), to develop a latent image, there was obtained a developed image with clear outlines and very sharp contrast.

From this developed image, more than 200,000 copies of substantially the same desirable quality were produced.

CONTROL 5

A toner (1) for comparison for the development of electrostatic charge images was obtained by repeating the procedure of Example 17, excepting 10 parts of the same carbon black as used in Example 1 was used in the place of 30 parts of the carbon black-graft polymer (1) obtained in Example 17. From this toner (1) for comparison, a developing agent (1) for comparison was similarly prepared.

When this developing agent (1) for comparison was subjected to the same test as in Example 17, there was obtained a developed image in which serious fogging was produced in the non-picture portion to impair the clarity of the image. The photoconductor was serously smeared after the development of image was repeated.

CONTROL 6

A toner (2) for comparison for the development of electrostatic charge images was obtained by repeating the procedure of Example 18, excepting the carbon black-graft polymer (1) for comparison obtained in Control 1 was used in the place of the carbon black-graft polymer (2) obtained in Example 2. From this toner (2) for comparison, a developing agent (2) for comparison was similarly prepared. When this developing agent (2) was subjected to the same test as in Example 1, there was obtained a developed image in which serious fogging was produced in the non-picture portion to impair the clarity of the image. The photoconductor portion was seriously smeared after the development of image was repeated.

EXAMPLE 26

An unsaturated polyester having an acid number of 23 was obtained by subjecting 50 parts of isophthalic acid, 70 parts of maleic anhydride, 34 parts of ethylene glycol, and 38 parts of propylene glycol to esterification reaction under a current of nitrogen gas at 200° C. for 22 hours. An unsaturated polyester resin (hereinafter referred to as "unsaturated polyester resin (1)") was obtained by combining 40.6 parts of this unsaturated polyester with 50.4 parts of styrene.

Then a thermosetting resin composition of the present invention (hereinafter referred to as "resin composition (1)") was produced by mixing 100 parts of the unsaturated polyester resin (1) with 18 parts of the carbon black-graft polymer (1) obtained in Example 1.

The produced resin composition (1) was stirred with 1.3 parts of t-butyl peroxybenzoate, 4 parts of zinc stearate, and 100 parts of calcium carbonate to produce a paste. In an impregnating liquid obtained by mixing this paste with 1.0 part of magnesium oxide, 70.7 parts of glass fibers 25 mm in length were immersed. The wet glass fibers were compressed into a sheet between two polyethylene sheets and left aging at 40° C. for 40 hours to produce a sheet molding compound (SMC). In a mold 300 mm×100 mm in cavity size, this SMC was pressed at 145° C. under 50 kg/cm² of pressure for 4 minutes to produce a flat sheet 2 mm in thickness. When this molded product and the mold were observed with unaided eyes, no uneven coloration was found in the product and no smear in the mold. When the SMC was tested for shrinkage by molding in accordance with the method of JIS K-6911, the shrinkage of this SMC was found to be 0.09%. When the molded product was tested for surface gloss with a surface gloss meter, the gloss as expressed in terms of reflectance at a measuring angle of 60 degrees was found to be 85.3%. The result indicates that the molded product was excellent in surface smoothness.

EXAMPLE 27

A thermosetting resin composition of the present invention (hereinafter referred to as "resin composition (2)") was obtained by repeating the procedure of Example 26, excepting the carbon black-graft polymer (7) obtained in Example 7 was used in the place of the carbon black-graft polymer (1) obtained in Example 1. From the resin composition (2), a molded product was obtained by following the procedure of Example 26. When this molded product and the mold were observed with unaided eyes, no uneven coloration was found in the molded product and no smear in the mold. When the molded product was tested for shrinkage by molding and for surface gloss in the same manner as in Example 26, the shrinkage was found to be 0.075% and the gloss to be 84.2%. The results indicate that the molded product possessed very high surface smoothness.

EXAMPLE 28

A clear resin solution (hereinafter referred to as "amino resin (1)") was obtained by subjecting a mixture consisting of 600 parts of benzoguanamine, 600 parts of melamine, and 1675 parts of 37% formalin in conjunction with 6.7 part of an aqueous 10% sodium carbonate solution to resinification reaction at 80° C. for 90 minutes in a reaction vessel provided with a thermometer, a stirrer, and a reflux condenser.

In a kneader, 2875 parts of a solution of the amino resin (1) and 780 parts of pulp sheet were mixed at temperatures in the range of 45° to 55° C. for 30 minutes. The resultant mixture was dried in a hot air drier at 70° C. for 4 hours. In a ball mill, 100 parts of the dry product obtained above, 20 parts of the carbon black-graft polymer (8) obtained in Example 9, 0.15 part of phthalic anhydride, and 0.5 part of zinc stearate were ground and mixed for 24 hours, to obtain a resin composition (hereinafter referred to as "resin composition (3)"). The resin composition (3) was tested for properties by the method set forth in JIS K-6911-1970. The results were shown in Table 3.

EXAMPLE 29

A clear resin solution (hereinafter referred to as "amino resin (2)") was obtained by subjecting a mixture consisting of 300 parts of melamine and 580 parts of 37% formalin in conjunction with 3.0 parts of an aqueous 28% ammonia solution to resinification reaction at 70° C. for 120 minutes in the same reaction vessel as in Example 28.

In a kneader, 514 parts of the amino resin (2) and 220 parts of pulp sheets were mixed at temperatures of 45° to 55° C. for 30 minutes. The resultant mixture was dried in a hot air dreer at 70° C. for 4 hours. In a ball mill, 100 parts of the dry product, 20 parts of the carbon black-graft polymer (2) obtained in Example 2, 0.05 part of phthalic anhydride, and 0.5 part of zinc stearate were ground and mixed for 24 hours, to produce a thermosetting resin composition (hereinafter referred to as "resin composition (4)"). The resin composition (4) was tested for properties. The results were as shown in Table 3.

TABLE 3

| | | Example 28 | Example 29 | Control 7 | Control 8 |
| | | Thermosetting resin compositions | | Thermosetting resin compositions for comparison | |
| Example and Control | | (3) | (4) | (1) | (2) |
| | Cup molding property | Good with no uneven coloration | Good with no uneven coloration | Uneven coloration found | Uneven coloration found |
| Items of test | Bending strength (kg/mm²) | 14.5 | 15.2 | 12.1 | 12.8 |
| | Shrinkage by molding (%) | 0.310 | 0.283 | 0.401 | 0.392 |
| | Post-shrinkage (%) | 0.701 | 0.685 | 0.988 | 0.953 |

Method of test:
Cup molding property - The method set forth in JIS K-6911-1970 was used with necessary modifications.
Bending strength - The method set forth in JIS K-6911-1970 was used with necessary modifications.
Shrinkage by molding - The method set forth in JIS K-6911-1970 was used with necessary modifications.
Post-shrinkage - A given molded product was left standing at 70° C. for 20 hours. The shrinkage which occurred during this standing was measured by the same method as used for the determination of the shrinkage by molding.

From the results of Table 3, it is noted that the thermosetting resin compositions of the present invention enjoyed thorough dispersion of carbon black and excelled in coloring property, mechanical strength, and shrinkage.

EXAMPLES 30 THROUGH 36

Polyester compositions were obtained by mixing 100 parts of polyethylene terephthalate chips severally with the carbon black-graft polymers (1), (2) and (4) through (8) obtained in Examples 1, 2, 4, 5, 7, 9, and 6.

The polyester compositions were melted at 290° C. and extruded into sheets, subsequently biaxially stretched at a longitudinal elongation ratio of 350% and a lateral elongation ratio of 400%, and heat set at 200° C. to produce films 15 microns in thickness.

EXAMPLE 37

In a reaction vessel, 100 parts of dimethyl terephthalate and 70 parts of ethylene glycol were combined with 0.035 part of manganese acetate tetrahydrate and the resultant mixture was heated and, at the same time, distilled to effect expulsion of methanol, to complete interesterification reaction.

Then, the interesterifiction product, 0.03 part of trimethyl phosphate and 0.03 part of antimony trioxide added thereto and 5 parts of an ethylene glycol solution of the carbon black-graft polymer (6) prepared in Example 6 further added thereto were subjected to polycondensation by the conventional method, to produce a polyester composition.

This polyester composition was processed to produce a film by following the procedure of Examples 30 through 36.

The films of Examples 30 through 36 and Example 37 were tested for coarse grains and film surface roughness by the methods to be described later on. The results were as shown in Table 4.

CONTROL 9:

A polyester film for comparison was obtained by following the procedure of Example 37, excepting diethylene glycol slurry of untreated carbon black #45 was used in the place of the diethylene glycol solution of carbon black graft polymer (6) prepared in Example 9. The film for comparison was tested for coarse grains and film surface roughness. The results are shown in Table 4.

Method for evaluation of film (1) Coarse grains

Under a microscope using polarized transmitting light, a given film was conglomerized particles of carbon black occurring in the portion irradiated with the polarized light and exceeding 5 $\mu$m in major diameter were counted. Based on the number of the conglomerated particles, the coarse grains were rated on the four-grade scale, wherein:

Super grade: The number of conglomerated particles is less than 10/50 cm$^2$.

First grade: The number of conglomerated particles is between 10 and 20/50 cm$^2$.

Second grade: The number of conglomerated particles is between 20 and 50/50 cm$^2$ Third grade: The number of conglomerated particles is not less than 50/50 cm$^2$.

A film rated as super grade or first grade is accepted for practical use.

(2) Surface coarseness

This property was determined by measurement with a surface roughness tester produced by Sloan corp., using a touch needle 12.5$\mu$ in diameter under contact pressure of 50 mg.

TABLE 4

|  | Coarse particle | Surface coarseness (micron) |
|---|---|---|
| Example 30 | Super grade | 0.011 |
| 31 | Super grade | 0.020 |
| 32 | Super grade | 0.009 |
| 33 | Super grade | 0.015 |
| 34 | Super grade | 0.013 |
| 35 | First grade | 0.025 |
| 36 | First grade | 0.023 |
| 37 | Super grade | 0.010 |
| Control 9 | Third grade | 0.050 |

The films obtained in Examples 30 through 37 invariably possessed only few coarse particles and highly smooth surfaces. In the case of the film of Control 9, the number of coarse particles was large and the sheet of resin during the course of conversion into film sustained ruptures and the conversion itself proceeded with difficulty because the carbon black used therein had not undergone the surface treatment.

EXAMPLES 38 THROUGH 44 AND CONTROL 10

A homogeneous solution was obtained by stirring 30 parts of a saturated polyester resin (produced by Toyo Boseki Co., Ltd. and marketed under trademark designation of "Vylon 200") as a binder in a solvent consisting of 30 parts of toluene, 10 parts of methylethyl ketone, 20 parts of butyl acetate and 10 parts of cyclohexanone. Then, in separate portions of this solution, the carbon black-graft polymer (1), (2), (4), (5), (7), (8) and (6) obtained respectively in Examples 1, 2, 4, 5, 7, 9, and 6 and the same carbon black as used in Example 1 added in the amounts indicated in Table 5 were thoroughly stirred, to produce carbon black-containing coating compositions (1) through (7) and a carbon black-containing coating compositions (1) for comparison.

The carbon black-containing coating compositions were applied on aluminum sheets each in an amount calculated to produce a dry layer 25 microns in thickness and dried at room temperature to obtain coats. The coats thus formed were tested for film-forming property. The results were as shown in Table 5.

TABLE 5

| | Example | 38 (1) | 39 (2) | 40 (3) | 41 (4) | 42 (5) | 43 (6) | 44 (7) | Control 10 (1) for comparison |
|---|---|---|---|---|---|---|---|---|---|
| | Carbon black-containing coating composition | | | | | | | | |
| Proportion of carbon black-containing coating composition contained (parts) | Carbon black-graft polymer (1) | 3 | | | | | | | |
| | Carbon black-graft polymer (2) | | 4.5 | | | | | | |
| | Carbon black-graft polymer (4) | | | 6 | | | | | |
| | Carbon black-graft polymer (5) | | | | 4.5 | | | | |
| | Carbon black-graft polymer (7) | | | | | 7.5 | | | |

TABLE 5-continued

| Example | | | Example | | | | | | Control 10 |
|---|---|---|---|---|---|---|---|---|---|
| Carbon black-containing coating composition | | 38 (1) | 39 (2) | 40 (3) | 41 (4) | 42 (5) | 43 (6) | 44 (7) | (1) for comparison |
| | Carbon black-graft polymer (8) | | | | | | 4.5 | | |
| | Carbon black-graft polymer (6)* | | | | | | | 6 | |
| | Carbon black (MA-600) | | | | | | | | 1.5 |
| | Bilon 200 | 30 | 30 | 30 | 30 | 30 | 30 | 30 | 30 |
| | Solvent | 70 | 70 | 70 | 70 | 70 | 70 | 70 | 70 |
| Coat properties | Coloring property | O | O | O | O | O | O | O | X |
| | Gloss | 83 | 85 | 80 | 82 | 82 | 85 | 83 | 75 |
| | Adhesiveness | 10 | 10 | 10 | 10 | 10 | 10 | 10 | 8 |
| | Frictional coefficient | 0.27 | 0.29 | 0.32 | 0.31 | 0.29 | 0.28 | 0.31 | 0.38 |
| Solution stability | | O | O | O | O | O | O | O | X |

*1: Dieylene glycol solution (carbon black content 25%)

It is clearly noted from Table 5 that the carbon black-containing coating compositions according with the present invention showed highly satisfactory dispersibility and the coats formed with these compositions possessed uniform coloring property and excelled in adhesiveness and lubricity.

EXAMPLE 45 AND CONTROL 11

In MEK, a vinyl chloride-vinyl acetate copolymer (produced by Nippon Zeon Co., Ltd. and marketed under product code of "400X-110A") as a binder, a polyurethane (produced by Japan Polyurethane Co., Ltd. and marketed under trademark designation of "Nipporan 2301"), and a polyisocyanate (produced by Japan Polyurethane Co., Ltd. and marketed under trademark designation of "Coronate L") were dissolved in the amounts indicated in Table 6. In the resultant solutions, the carbon black-graft polymer (1) obtained in Example 1 and carbon black (Asahi #60) added thereto in the amounts indicated in Table 6 were thoroughly stirred, to produce a carbon black-containing coating composition (8) and a carbon black-containing coating composition (2) for comparison.

On polyethylene terephthalate films, the carbon black-containing coating compositions were applied each in an amount calculated to produce a dry layer 1.5 microns in thickness. The applied layers of the compositions were dried at room temperature to product coats, which were tested for film-forming property. The results were as shown in Table 6.

TABLE 6

| Carbon black-containing coating composition | Example 45 (8) | Control 11 (2) for comparison |
|---|---|---|
| Composition of Carbon black-containing coating composition (part) | | |
| Colored microfine globular particle (1) | 60 | |
| Carbon black (Asahi #60) | | 30 |
| 400X-110A | 17 | 30 |
| Nippolan 2301 | 9 | 15 |
| Coronate L | 14 | 25 |
| Methylethyl ketone | 300 | 300 |
| Quality of coat | | |
| Antistatic property | $1.5 \times 10^4$ | $8.5 \times 10^4$ |
| Frictional coefficient | 0.25 | 0.34 |
| Wear Resistance | O | X |
| Stability of solution to withstand storage | O | X |

It is clearly noted from Table 6 that the carbon black-containing coating composition of the present invention exhibited highly desirable dispersibility and excelled in antistatic property, slipping property, and wear resistance.

EXAMPLES 46 AND 47 AND CONTROL 12

In separate portions of an aqueous 40% epoxy ester resin dispersion (produced by Nippon Shokubai Kagaku Kogyo Co., Ltd. and marketed under trademark designation of "Arolon 5"), the carbon black-graft polymers (4) and (6) obtained in Examples 4 and 6 and the same carbon black as used in Example 4 added in the amounts indicated in Table 7 in conjunction with additives were thoroughly stirred to produce carbon black-graft polymer-containing coating compositioins (9) and (10) and a carbon black-containing coating compositioin (3) for comparison.

The carbon black-graft polymer-containing and carbon black-containing coating compositions are applied on polished soft steel sheets each in an amount calculated to produce a dry layer 30 microns in thickness. The applied layers were dried at 60° C. for 20 minutes to form coats, which were tested for film-forming property. The results were as shown in Table 7.

TABLE 7

| Example | Example | | Control |
|---|---|---|---|
| | 46 | 47 | 12 |
| CB-containing coating composition | (9) | (10) | (3) for comparison |
| Proportion Carbon black-graft polymer (4) | 4.8 | | |
| of CB-Carbon black-graft polymer (6) *1 | | 4.8 | |
| containing Carbon black (MR-100R) | | | 1.2 |
| Composition 5 | 100 | 100 | 100 |
| contained  Cobalt naphthenate | 0.3 | 0.3 | 0.3 |
| (parts)  104*2 | 0.6 | 0.6 | 0.6 |
| Coat  Coloring Property | O | O | X |
| Properties  Gloss | 94 | 95 | 90 |
|   Adhesiveness | 10 | 10 | 9 |
|   Corrosionproofness | 1-2 | 2-3 | 4-5 |
| Solution stability | O | O | X |

*1: Diethylene glycol solution (carbon black content 25%)
*2: 2,4,7,9-Tetramethyl-5-decyl-4,7-diol (produced by Nisshin Chemical Co., Ltd.)

It is clearly noted from Table 7 that the carbon black-graft polymer-containing coating composition of the present invention showed highly desirable dispersibility even when water was used as a medium and the coat formed with the composition possessed coloring property and excelled in adhesiveness, lubricity, etc.

In the test mentioned above, the properties of coat were determined by the following methods.

Coloring property: This property was determined by visual examinaton of the condition of coloration of a given coat and rating condition on the two-point scale, wherein the circle ( ○ ) stands for high gloss of coat due to uniform coloration and the cross (χ) for suppressed gloss of coat due to uniform coloration.

Gloss: This property was determined by measuring the reflectance of light at a fixed angle of 60°.

Adhesiveness: This property was determined by incising perpendicularly intersecting grooves at intervals of 1 mm to form 100 squares, applying an adhesive tape fast on the film containing the grooves enclosing the squares, abruptly separating the grooves enclosing the squares, abruptly separating the adhesive tape, and rating the number of unseparated squares of the 10-point scale.

Frictional coefficient: This property was determined by measuring the dynamic frictional coefficient, μ, (3.3 cm/sec. of a stainless steel ball with a surface proper testing machine.

Antistatic property: This property was determined by a procedure of allowing a given coated article to stand for 24 hours under an atmosphere kept at 25° C. and 60% RH and, at the end of the standing, measuring the surface electric resistance of the coated article.

Wear resistance: This property was determined by causing a given coated article to reciprocate 100 times in a Gakushin type dye fastness testing machine in accordance with the method set forth in JIS L-1084 45R and subsequently visually examining the condition of wear caused on the coated article by the friction on the two-point scale, wherein the circle ( ○ ) stands for absence of wear and the cross (χ) for presence of wear.

Corrosionproofness: This property was determined by exposing a sample at the end of the spray, containing cross cuts to 72 hours' salt spray and, measuring widths (mm) of rust-forming portions in the cross cuts and rating the results of measurement.

Solution stability: This property was determined by preserving a given carbon black-graft polymer-containing coating composition in a room kept at 25° C. for 6 months and, after the standing, visually examining a change in the condition of the solution, and rating the found change on the two-point scale, wherein the circle ( ○ ) stands for absence of change and the cross (χ) for occurrence of precipitate of carbon black.

EXAMPLE 48

Carbon black dispersions (I) through (IV) and carbon black dispersions (I) and (II) for comparison were obtained by stirring the carbon black-graft polymers (1), (2), (8) and (9) obtained in Examples 1, 2, 9 and 10 and the carbon black-graft polymers (1) and (2) obtained in Controls 1 and 2 severally with a 1/1 mixed solvent of toluene/ethyl acetate added thereto in an amount calculated to give a carbon black concentratioin of 30% in a stirrer provided with a propeller blade. The dispersions were tested for particle diameter of carbon black by the centrifugal sedimentation method. During the course of the determination, the carbon black concentration of a sample suspension was adjusted with a 1/1 mixed solvent of toluene/ethyl acetate so as to allow the light transmittance would fall in the optimum range. The numerical values found by the test are shown in conjunction with the particle diameter of untreated carbon black in Table 8.

TABLE 8

| Carbon black dispersion | Particle diameter (μm) |
| --- | --- |
| (I) | 0.06 |
| (II) | 0.05 |
| (III) | 0.04 |
| (IV) | 0.05 |
| (I) for comparison | 1.1 |
| (II) for comparison | 1.4 |
| Untreated carbon black | 5.0 |

When the carbon black dispersions (I) through (IV) were used as pigment pastes for acryl lacquers, there were obtained colored lacquers enjoying highly desirable stability of carbon black dispersion. In contrast, a colored lacquers similarly obtained by using carbon black dispersions for comparison were observed to entail separation of pigment.

EXAMPLE 49

The same flask as used in Example 1 was charged with 217 parts of toluene. The solvent in the flask, with nitrogen gas kept blown therein, was heated to 90° C. To the hot solvent in the flask, a mixture prepared in advance by dissolving 5.44 parts of thioglycolic acid and 1.32 parts of azobisisobutyronitrile in a polymerizable monomer consisting of 480 parts of methyl methacrylate and 20 parts of n-butyl acrylate was added dropwise through a dropping funnel over a period of 2 hours. The resultant mixture was further stirred for 5 hours to effect polymerization reaction. The molecular weight, Mn, of this polymer, by the GPC test, was found to be 9,500.

Then, by allowing 185.1 parts of the reaction product (a solution containing a prepolymer possessing a terminal carboxyl group) to react with 2.95 parts of 2-p-phenylene-bis-2-oxazoline at 80° C. for 2 hours, there was obtained a solution (nonvolatile content 70%) of a polymer possessing an oxazoline group as a reactive group.

In a pressure kneader, 40 parts of the solution (nonvolatile content 70%) of the polymer and 20 parts of the same carbon black as used in Example 4 were kneaded at 160° C., to produce a carbon black-graft polymer dispersion, which was lebeled as carbon black-graft polymer dispersion (V). The particle diameter of carbon black in this dispersion, by the same test as in Example 1, was found to be 0.06 μm. When the carbon black dispersion (V) was mixed by stirring with a printing ink vehicle, there was obtained printing ink possessing highly desirable dispersibility of carbon black.

EXAMPLE 50

In the same flask as used in Example 1, 200 parts of a terminal carboxyl group-containing linear saturated polyester (a product of Nippon Shokubai Kagaku Kogyo Co., Ltd. possessing a molecular weight, Mn, of 6,000 and an involatile content of 50% and marketed under trademark designation of "Aroplaz OB-63") and 3.60 parts of 2-p-phenylene-bis-2-oxazoline added thereto were heated at 110° C. for 2 hours to effect reaction. Consequently, there was obtained a solution (involatile content 50.9%) of a polymer possessing a terminal oxazoline group as a reactive group. By kneading 40 parts of the solution (involatile content 50.9%) of the polymer possessing terminal oxazoline group and 20 parts of the same carbon black as used in Example 4 under the same conditions as in Example 1, there was obtained a carbon black-graft polymer dispersion, which was leveled as carbon black-graft polymer dispersion (VI). The particle diameter of carbon black in the dispersion, by the same test as in Example 48, was found to be 0.08 μm. When 10 parts of the carbon black dispersion (VI) (pigment paste) and 90 parts of the same linear saturated polyester as mentioned above were mixed by stirring, there was obtained a black enamel possessing highly desirable dispersibility of carbon black. This enamel produced a coating of high gloss.

EXAMPLE 51

The same flask as used in Example 1 was charged with 400 parts of isopropanol. The contents of the flask, with nitrogen gas kept blown therein, was heated to the boiling point of isopropanol. To the heated isopropanol in the flask, a mixture prepared in advance by dissoling 8 parts of benzoyl peroxide in a polymerizable monomer consisting of 100 parts of hydroxyethyl acrylate, 30 parts of methyl acrylate, 60 parts of ethyl acrylate, and 10 parts of glycidyl methacrylate was added dropwise through a dropping funnel over a period of 2 hours. The resultant mixture was further stirred for 5 hours. After 300 part of all isopropanol was expeled, 100 parts of water was added to produce a polymer solution. The molecular weight, Mn, of this polymer, by the GPC test, was found to be 2,200.

20 parts of the aqueous solution of the polymer possessing an epoxy group as a reactive group, 20 parts of a water-soluble acryl resin (product of Nippon Shokubai Kagaku Kogyo Co., Ltd. and marketed under trademark designation of "Arolon 76"), and 20 parts of the same carbon black as used in Example 4 were kneaded in a pressure kneader at 160° C. to effect reaction. Consequently, there was obtained a carbon black-graft polymer dispersion, which was labeled as carbon black dispersion (VII). When this dispersion was diluted with a 1/1 mixed solvent of isopropanol/water for adjustment of the light transmittance and then tested for particle diameter by the centrifugal sedimentation method, the particle diameter was found to be 0.04 microns. When 60 parts of the carbon black dispersion (VII) was diluted by stirring with 40 parts of water and used as a water sign pen ink, the pen produced clean unbroken letters even after a total 3,000 letters. The letters showed highly satisfactory resistance to water and remained intact even after several months' standing. Thus, the pen showed good writing property.

EXAMPLES 52 THROUGH 55 AND CONTROLS 13 AND 14

(Kneading)

In the same mill as used in Example 1, a varying combination of ingredients shown in Table 9 was kneaded at 140° C. for 2 minutes. The resultant blend was then kneaded with an 8-inch a roll at a surface temperature of 50±5° C. in accordance with the method of JIS K-6383, to produce a rubber composition.

TABLE 9

| | Example | | | | Control | |
|---|---|---|---|---|---|---|
| Rubber component | 52 | 53 | 54 | 55 | 13 | 14 |
| JSR 1500 (1) | 100 | 100 | 100 | 100 | 100 | 100 |
| Carbon black component | | | | | | |
| Carbon black-graft polymer (1) | 60 | | | | | |
| Carbon black-graft polymer (2) | | 60 | | | | |
| Carbon black-graft polymer (3) | | | 60 | | | |
| Carbon black-graft polymer (8) | | | | 60 | | |
| Carbon black (MA-600) | | | | | 30 | |
| Grafted carbon black (1) for comparison | | | | | | 60 |
| Stearlic acid | 1 | 1 | 1 | 1 | 1 | 1 |
| ZnO | 5 | 5 | 5 | 5 | 5 | 5 |
| Sulfur | 1.5 | 1.5 | 1.5 | 1.5 | 1.5 | 1.5 |
| Vulcanizing agent | 1 | 1 | 1 | 1 | 1 | 1 |

(Note 1) Styrene-butadiene rubber (produced by Japan synthetic Rubber Co., Ltd.)
(Note 2) Produced by Ouchi Shinko Co., Ltd.

(Vulcanization and molding of rubber composition)

The rubber composition obtained by the kneading mentioned above was press vulcanized at 145° C. for 20 minutes to produce a sheet 2 mm in thickness.

(Method for evaluation of properties)

Dispersibility of carbon
This property was determined by the observation of a sample under a microscope (at 100 magnifications), with the results rated on the four-point scale, wherein the double circle ( ◉ ) stands for uniform dispersion and substantial absence of conglomerated particles exceeding several microns, the circle (○) for sparce occurrence of conglomerated particles exceeding several microns, the triangle (Δ) for dense occurrence of conglomerated particles exceeding several microns and including larger particles 20 to 30 microns in diameter, and the cross (×) for dense occurrence of larger particles.

Tensile strength
This property was determined by the method of JIS K-6301, with necessary modifications.

Wear resistance
This property was determined in accordance with the British Standard, 930, Part A9, (1957) with necessary modificatins. The results were rated, based on the numerical value of the composition of Control 13 taken as 100. The desirability of wear resistance increases with the increasing numerical value of the property.

Resistance to aging
This property was determined by a procedure of keeping a given molded article of rubber in a gear oven at 100° C. for hours and at the end of the standing, testing the molded article for tensile strength. It was reported in the ratio of retention of the initial magnitude of tensile strength. The results were as shown in Table 10. It is noted from the results that the rubber compositions according with the present invention, other than those of Controls 13 and 14, invariably exhibited highly satisfactory properties.

TABLE 10

| The test results of properties | | | | | | |
|---|---|---|---|---|---|---|
| | Example | | | | Control | |
| | 52 | 53 | 54 | 55 | 13 | 14 |
| Dispersibility of carbon | ◉ | ◉ | ◉ | ◉ | X | Δ |
| Tensile strength (kg/cm²) | 315 | 285 | 300 | 310 | 150 | 178 |
| Wear resistance (index) | 113 | 108 | 115 | 114 | 100 | 101 |

TABLE 10-continued

| | The test results of properties | | | | | |
|---|---|---|---|---|---|---|
| | Example | | | | Control | |
| | 52 | 53 | 54 | 55 | 13 | 14 |
| Resistance to thermal aging (%) | 95 | 90 | 93 | 94 | 53 | 62 |

EXAMPLE 56

Thermographic transfer inks severally containing the carbon black-graft polymers (1), (2), (7), (8), and (11) obtained in Examples 1, 2, 7, 9 and 12, the carbon black-graft polymers (1) and (2) obtained in Controls 1 and 2, and the same carbon black as used in Example 4 in the proportions indicated in Table 11 were prepared.

EXAMPLE 57

A polymer possessing a molecular weight of Mn=4,000 and possessing an N-hydroxyalkylamide group as a reactive group was obtained by repeating the procedure of Example 1, excepting 120 parts of styrene, 76 parts of stearyl acrylate, and 4 parts of N-hydroxyethyl methacrylamide were used in the place of the polymerizable monomers used in Example 1. In the same mill as used in Example 1, a carbon black graft polymer was obtained by repeating the procedure of Example 1, excepting 100 parts of the polymer thus obtained, 70 parts of carnauba wax which is component of ink for thermographic transfer, and 20 parts of the same carbon black as used in Example 1 were used instead.

TABLE 11

| Thermographic transfer ink (No.) | Carbon black-graft polymer | | Wax | |
|---|---|---|---|---|
| | No. | Amount (parts) | Kind | Amount (parts) |
| [1] | (1) | 30 | Carnauba wax | 70 |
| [2] | (2) | 45 | Paraffin wax | 55 |
| [4] | (7) | 50 | Carnauba wax | 50 |
| [5] | (8) | 45 | Carnauba wax | 55 |
| [6] | (11) | 47 | Paraffin wax | 53 |
| [1] for comparison | (1) for comparison | 30 | Carnauba wax | 70 |
| [2] for comparison | (2) for comparison | 19 | Carnauba wax | 81 |
| [3] for comparison | CB untreated carbon black | 15 | Carnauba wax | 85 |

The inks of No. [1], [2], [4], [5], and [6] and those of No. [1] and [2] for comparison were each prepared by stirring the components at 100° C. for 30 minutes and the ink of No. [3] for comparison was prepared by stirring the components at 100° C. for 30 minutes and subsequently kneading the resultant mixture with a three-roll mill. The carbon black-graft polymer (15) obtained in Example 57 was used in its unmodified form as thermographic transfer ink No. (3). This ink was spread thinly on glass plates and observed under a microscope as to the state of dispersion of carbon black therein. The results of the observation were rated on the three-point scale (○, Δ, and ×). The results were as shown in Table 12.

TABLE 12

| Thermographic transfer ink No. | Dispersibility |
|---|---|
| [1] | ○ |
| [2] | ○ |

TABLE 12-continued

| Thermographic transfer ink No. | Dispersibility |
|---|---|
| [3] | ○ |
| [4] | ○ |
| [5] | ○ |
| [6] | ○ |
| [1] for comparison | Δ—× |
| [2] for comparison | × |
| [3] for comparison | Δ |

EXAMPLE 58

The thermographic transfer inks obtained in Example 56 were applied on biaxially oriented PET films 6 microns in thickness severally in an amount calculated to produce a dry layer 4 microns in thickness. The application was effected by heating a given ink to a temperature proper for the ink thereby converting into a fluid state, and rubbing the fluid ink on the film with a wire bar. The thermographic transfer sheets were each set in place on a thermal printer and pressed on sheets of ordinary paper to produce prints. The quality of a produced print was evaluated with respect to resolution and occurrence of spots of discontinuity in component lines of image. The results were rated on the five-point scale, wherein 5 stands for good quality and 1 for bad quality. The scratch strength of the produced image was determined by rubbing the image surface with a stainless steel bar terminating at one end thereof into a hemisphere 1.5 mm in diameter under a load of 100 g and measuring the degree of scratch inflicted on the surface. The results of measurement were rated on the three-point scale (○, Δ, and ×). The results are shown in Table 13.

TABLE 13

| Thermographic transfer ink No. used | Quality of print (point) | Scratch strength |
|---|---|---|
| [1] | 5 | ○—Δ |
| [2] | 5 | ○—Δ |
| [3] | 5 | ○ |
| [4] | 5 | ○ |
| [5] | 5 | ○—Δ |
| [6] | 5 | ○ |
| [1] for comparison | 2 | Δ—× |
| [2] for comparison | 2 | × |
| [3] for comparison | 3 | × |

EXAMPLE 59

An ink ribbon coating agent was prepared by mixing 20 parts of the carbon black-graft polymer (1) obtained in Example 1, with 100 parts of polyurethane (a polyester type polyurethane possessing a molecular weight of about 30,000, obtained from adipic acid, 1,6-hexane diol, and MDI) as a binder component, and 70 parts of a solvent (an equivoluminal mixture of tetrahydrofuran and methylethyle ketone). This ink ribbon coating agent was applied to the rear side of a thermosensitive transfer tape and the thermosensitive transfer tape was set in place on a thermal coating agent for quality. The thickness of the applied coat was about 5 microns. The results of the test indicate that the applied coat excelled in both slipping property and antistatic property.

EXAMPLE 60

An ink ribbon coating agent was prepared by mixing 20 parts of the carbon black graft polymer (8) obtained in Example 9, with 100 parts of polyurethane (a polyester type polyurethane possessing a molecular weight of about 30,000, obtained from adipic acid, 1,6-hexane diol, and MDI) as a binder component, and 70 parts of a solvent (an equivoluminal mixture of tetrahydrofuran and methylethyle ketone). This ink ribbon coating agent was applied to the rear side of a thermosensitive transfer tape and the thermosensitive transfer tape was set in place on a thermal coating agent for quality. The thickness of the applied coat was about 4 microns. The results of the test indicate that the applied coat excelled in both slipping property and antistatic property.

EXAMPLE 61

Back-coating agents were prepared by mixing the carbon black-graft polymers (1) through (3) and (5), (7), (9) and (10), obtained in Examples 1 through 3 and 5, 7, 10 and 11, the carbon black-graft polymers (1) and (2) obtained in Controls 1 and 2 and the same carbon black as used in Example 4 severally with a varying binder component and a varying solvent indicated in Table 14. The back-coating agents were applied on video tapes on the rear side to test for performance. The method of test is shown below and the results of the test are given collectively in Tabel 14.

(Method of test)
1. Preparation of test specimen
    (a) Dispersion of carbon black-graft polymer
    A given carbon black-graft polymer, a binder component, and a solvent were placed in prescribed amounts in a container and were stirred with a propeller blade stirrer at room temperature for 15 minutes.
    (b) Thickness of back-coat layer
    A given back-coating agent was applied in an amount calculated to produce a dry layer about 5 μm in thickness.
2. Test for performacne
    (a) Degree of dispersion of carbon black The diameter (μm) of carbon black particles dispersed in a given back-coating agent was measured by the centrifugal sedimentation method.
    (b) Wear resistance of back-coat layer
    This property was determined by keeping a white cotton cloth pressed with a force of 350 g/cm$^2$ against the back coat layer of a video tape and, at the same time, running the video tape and, at the same time, running the video tape for a prescribed length of time and measuring the degree of smearing inflicted on the cotton cloth. The results of the measurement were rated on the four-point scale, wherein the double circle ( ⊚ ) stands for absence of smearing of cotton cloth (absence of separation of carbon black), the circle (○) for slight occurrence of smearing of cotton cloth, the triangle (Δ) for fair occurrence of smearing of cotton cloth, and the cross (×) for conspicuous occurrence of smearing of cotton cloth (opulent separation of carbon black).

TABLE 14

| Composition of back-coating agent | | | Test for performance | |
|---|---|---|---|---|
| Carbon black-graft polymer (solids) | Binder (solids) (Note) | Solvent | Dispersion of carbon black (um) | Wear resistance of back-coat layer |
| (1) 20 part | Polyurethane 10 part | toluene/MEK/cyclohexanone = 3/3/1 70 | 0.10 | ○ |
| (2) 20 | Polyurethane 10 | " 70 | 0.08 | ⊚ - ○ |
| (3) 30 | — | " 70 | 0.08 | ⊚ - ○ |
| (5) 24 | Vinyl chloridevinyl acetate copolymer 6 | THF/MEK = 1/1 70 | 0.11 | ○ |
| (7) 30 | — | toluene/MEK/cyclohexanone = 3/3/1 70 | 0.05 | ⊚ |
| (9) 20 | Polyurethane 10 | " 70 | 0.09 | ⊚ |
| (10) 20 | Polyurethane 10 | " 70 | 0.10 | ○ |
| (1) for comparison 20 | Polyurethane 10 | " 70 | 1.1 | Δ |
| (2) for comparison 20 | Polyurethane 10 | " 70 | 1.5 | Δ |
| (3) for comparison 15 | Polyurethane 15 | " 70 | 5.0 | X |

(Note)
Polyurethane: A polyester type polyurethane of a molecular weight of about 30,000, obtained from adipic acid, 1,6-hexane diol, and MDI.
Vinyl chloride-vinyl acetate copolymer: A 80/20 vinyl chloride/vinyl acetate copolymer.

What is claimed is:
1. A carbon black-graft polymer, produced by causing a polymer possessing within the molecular unit thereof at least one reactive group selected from an epoxy group, to react with the carbon black, wherein said polymer possesses one to two reactive groups on the average and a number average molecular weight in the range of 2,000 to 100,000.
2. A carbon black-graft polymer according to claim 1, wherein said polymer possessing a reactive group is a polymer selected from the group consisting of vinyl polymers, polyesters, and polyethers.
3. A carbon black-graft polymer according to claim 1, wherein the proportion of said polymer possessing a reactive group falls in the range of 1 to 3,000 parts by weight relative to 100 parts by weight of said carbon black.
4. A carbon black-graft polymer according to claim 1, wherein the proportion of said polymer possessing a reactive group falls in the range of 5 to 1,000 parts by weight relative to 100 parts by weight of said carbon black.

5. A carbon black-graft polymer according to claim 1, wherein the pH value of said carbon black is not more than 8.

6. A carbon black-graft polymer according to claim 1, wherein the pH value of said carbon black is not more than 6.

7. A carbon black-graft polymer according to claim 1, wherein said polymer possesses one reactive group on the average.

8. A carbon black dispersion, having dispersed in a dispersion medium a carbon black-graft polymer set forth in claim 1.

9. A carbon black dispersion according to claim 8, wherein the amount of the carbon black in said carbon black-graft polymer is in the range of 1 to 80% by weight, based on the amount of said dispersion.

10. A carbon black dispersion according to claim 8, wherein said dispersion medium is at least one member selected from the group consisting of water and organic dispersions.

* * * * *